United States Patent [19]

Rigsby et al.

[11] Patent Number: 5,739,592

[45] Date of Patent: Apr. 14, 1998

[54] POWER AND COMMUNICATIONS LINK BETWEEN A TRACTOR AND TRAILER

[75] Inventors: Bruce S. Rigsby, Charlestown; Troy Lynn Roney, Madison, both of Ind.

[73] Assignee: Grote Industries, Inc., Madison, Ind.

[21] Appl. No.: 594,943

[22] Filed: Jan. 31, 1996

[51] Int. Cl.$^6$ ............................................. B60D 1/62
[52] U.S. Cl. .................... 307/9.1; 307/10.1; 280/422; 340/825.06; 364/423.098; 364/424.045; 364/424.034
[58] Field of Search ........................ 307/9.1, 10.1, 307/10.8, 38, 40, 155, 125, 154; 439/35; 280/422, 420; 340/825.63, 825.06, 825.04, 825.03, 439, 458; 315/76; 180/170; 364/423.098, 424.045, 424.034, 424.035

[56] References Cited

U.S. PATENT DOCUMENTS

| | | | |
|---|---|---|---|
| 4,897,642 | 1/1990 | DiLullo et al. | 340/825.06 |
| 4,926,158 | 5/1990 | Zeigler. | |
| 5,142,278 | 8/1992 | Moallemi et al. | 307/10.1 |
| 5,385,476 | 1/1995 | Jasper. | |
| 5,397,924 | 3/1995 | Gee et al. | 307/9.1 |
| 5,442,810 | 8/1995 | Jenquin. | |
| 5,488,352 | 1/1996 | Jasper. | |
| 5,521,466 | 5/1996 | Vincent. | |

OTHER PUBLICATIONS

*Transport Topics*, "ABS Linkages", p. 65, Aug. 14, 1995.
*Transport Topics*, "NHTSA Adamant on Antilock Rule", p. 3, Dec. 18, 1995.
SAE J560, "Seven Conductor Electrical Connector for Truck–Trailer Jumper Cable", Jun., 1993.
SAE J1067, "Seven Conductor Jacketed Cable for Truck Tailer Connections", Oct., 1973.
Grote Industries, Inc. Catalog, pp. 122–124.
*Federal Register*, vol. 60, No. 47, FMVSS 101, Controls and Displays, FMVSS 105, Hydraulic Brake Systems, pp. 13254–13256, Mar. 10, 1995.
*Federal Register*, vol. 60, No. 47, FMVSS 121, Air Brake Systems, pp. 13256–13259, Mar. 10, 1995.

Department of Transportation, National Highway Traffic Safety Administration, 49 CFR Part 571, "Stability and Control of Medium and Heavy Vehicles During Braking", Dec. 8, 1995.

Department of Transportation, National Highway Traffic Safety Administration, 49 CFR Part 571, "Stability and Control of Medium and Heavy Vehicles During Braking; and Stopping Distance Requirements, Final Rule, Petitions for Reconsideration", Dec. 8, 1995.

*Primary Examiner*—William M Shoop, Jr.
*Assistant Examiner*—Peter Ganjian
*Attorney, Agent, or Firm*—Woodard, Emhardt, Naughton Moriarty & McNeit

[57] ABSTRACT

A system for providing an electrical power and electronic communication link between a tractor and trailer includes a tractor module associated with the tractor and a trailer module associated with the trailer. The tractor module controls a plurality of switching devices operable to switch a corresponding plurality of electrical lines extending between the tractor electrical system and the trailer to one of an electrical power line, a ground line and a communication line. The trailer module similarly controls a plurality of switching devices operable to switch a corresponding plurality of electrical lines extending between the trailer lighting system and the tractor electrical system to one of an electrical system of the trailer a communication line. The tractor and trailer modules are operable to establish a communication link therebetween and gather diagnostic data relating to the trailer electrical system, and to selectively route electrical power and/or ground to the trailer electrical system while maintaining control over the trailer lighting system each of the tractor and trailer modules is further operable to control their corresponding switching devices to switch back to the conventional electrical connection if the communication link is inoperable.

52 Claims, 19 Drawing Sheets

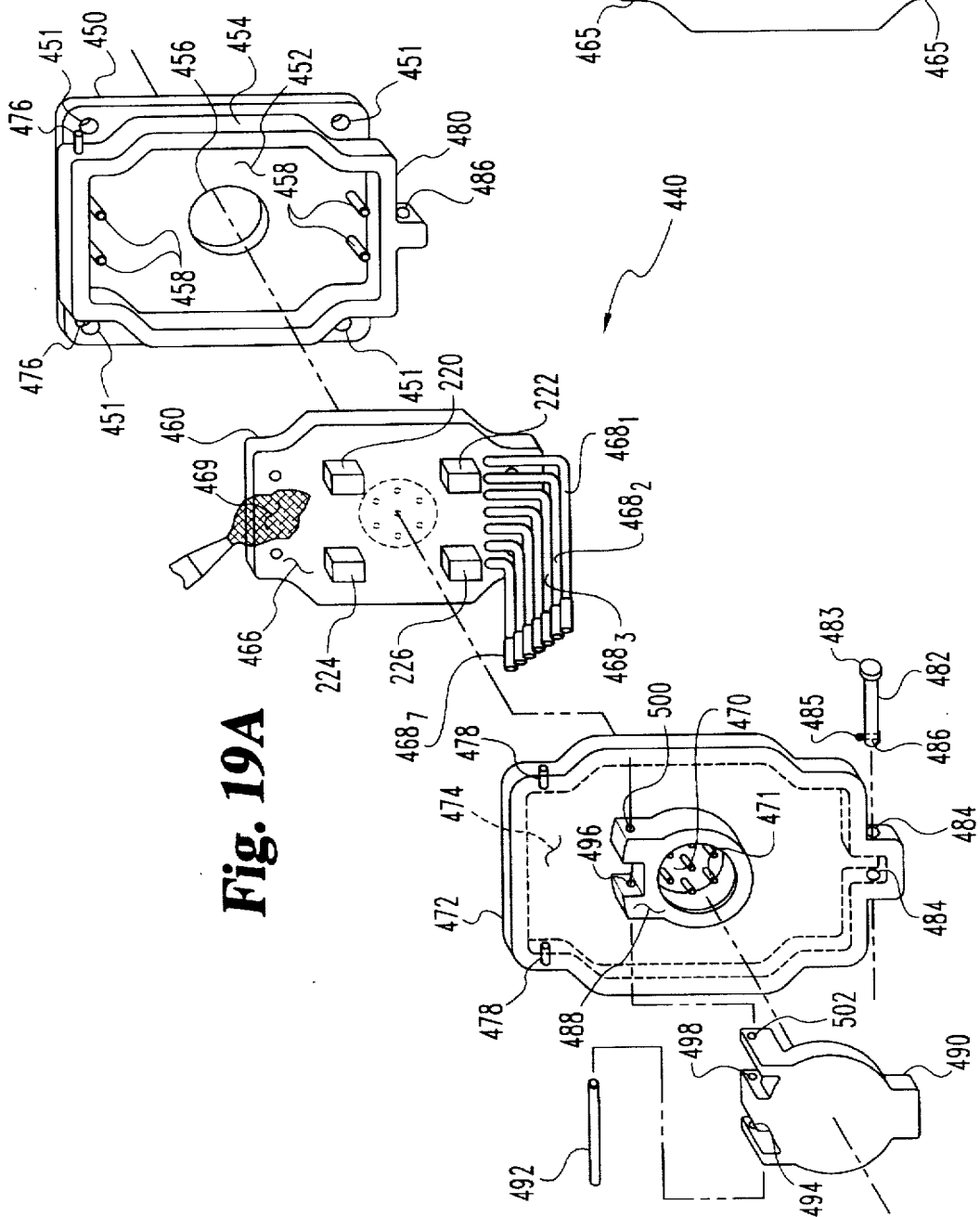

POWER AND COMMUNICATIONS LINK BETWEEN A TRACTOR AND TRAILER

FIELD OF THE INVENTION

The present invention relates generally to systems for controlling transmission of electrical power and electronic communications between a tractor and a trailer, and more specifically to such systems utilizing single wire communications between the tractor and trailer.

BACKGROUND OF THE INVENTION

For the past several decades, electrical power exchange between a tractor and trailer has been accomplished via a seven wire cable, or so-called "umbilical cord". The seven wire cable and associated seven pin connectors have become standard equipment in the tractor/trailer industry and have provided for the supply of electrical power to various trailer electrical functions such as turn signals, brake lamps, tail lamps, turn signals, side marker lamps, clearance lamps and dome lamps, as well as a ground reference for the these electrical circuits. In an effort to provide uniformity throughout the industry, the society of automotive engineers (SAE) has promulgated standards for both the seven wire cable (SAE-J1067) and associated seven pin connectors (SAE-J560).

As used hereinafter, the term "tractor" refers to any vehicle having another vehicle in tow, and therefore includes medium or heavy duty trucks, tractor trucks and tractor truck/trailer combinations having a further vehicle or vehicles in tow. The term "trailer" as used hereinafter refers to tractor truck trailers, semi-trailers and the like.

Referring to FIG. 1, an example of a typical prior art electrical connection system 50 for routing electrical power to an electrical trailer system is shown. A tractor 52 includes a tractor ignition system 54 which acts as an electrical power source to provide electrical power to a tractor electrical system 56 when the tractor 52 is in operation. Connected to tractor electrical system 56 are seven electrical lines $58_1$, $58_2, \ldots, 58_7$, which are configured in accordance with SAE J-1067 standards. Electrical lines $58_1$, $58_2, \ldots, 58_7$ extend from tractor electrical system 56 into a connector housing 60, typically referred to as a "tractor nosebox", which is typically attached to an exterior surface of tractor 52. Housing 60 has a seven conductor electrical connector 62 associated therewith, to which electrical lines $58_1$, $58_2, \ldots, 58_7$ are connected thereto in accordance with SAE J-560 standards.

A trailer 64 includes a trailer lighting system 66 which is operable to provide the aforementioned trailer lighting functions. Connected to trailer lighting system 66 are seven electrical lines $68_1$, $68_2, \ldots, 68_7$, which are configured in accordance with SAE J-1067 standards. Electrical lines $68_1$, $68_2, \ldots, 68_7$ extend from trailer lighting system 66 into a connector housing 70, or "trailer nosebox", which is typically attached to an exterior surface of trailer 64. Housing 70 has a seven conductor electrical connector 72 associated therewith, to which electrical lines $58_1$, $58_2, \ldots, 58_7$ are connected thereto in accordance with SAE J-560 standards.

A seven-conductor connector/cable 74, or "umbilical cord", connects tractor electrical connector 62 to trailer electrical connector 72 so that the tractor electrical system 56 controls, and provides electrical power to, the trailer lighting system 66.

Referring now to FIG. 2, a typical embodiment of a prior art seven-conductor connector/cable, or umbilical cord, 74 is shown. Umbilical cord 74 includes an SAE-J1067 seven wire jacketed cable 76 with an SAE-J560 seven conductor connector 78 connected thereto at each end. Each connector 78 has a front face 82 and a protrusion 80 extending away from the connector 78, the purpose of which will be described in detail hereinafter.

Referring now to FIG. 3, the front face 82 of connector 78 defines seven receptacles, or electrical terminals, therein which form electrical connections with a corresponding one of the seven wires contained within cable 76. Referring to FIG. 4, which is a cross-section of cable 76 taken along section lines 4—4 of FIG. 2, cable 76 contains seven wires surrounded by an electrically insulating jacket 98, in accordance with SAE-J1067. Referring to both FIGS. 3 and 4, SAE-J560 requires terminal 84 to contact the ground wire 100 (white wire) which must be at least a No. 8 gauge wire. Terminal 92 must contact the main power wire 102 (red wire) which must be at least a No. 10 gauge wire. Terminal 96 must contact general purpose wire 104 (black wire) which must be at least a No. 12 gauge wire. Terminal 94 must contact general purpose wire 106 (yellow wire) which must also be at least a No. 12 gauge wire. Terminal 90 must contact general purpose wire 108 (green wire) which must also be at least a No. 12 gauge wire. Terminal 86 must contact general purpose wire 110 (brown wire) which must further be at least a No. 12 gauge wire. Finally, terminal 88 must contact general purpose wire 112 (blue wire) which must also be at least a No. 12 gauge wire. All wires 100–112 are further required by SAE-J560 to be insulated wires, with wire 100 (white wire) having a nominal insulation wall thickness of 0.0254 mm and the remaining wires having a nominal insulation wall thicknesses of 0.813 mm. Although FIG. 4 shows some of wires 100–112 as having different wire insulation thicknesses so that all wires 100–112 appear to have identical final outer diameters, this is done for illustration purposes only, it being understood that, in practice, all wire insulation typically has nominal insulation wall thickness so that wires 100–112 have different final outer diameters consistent with their gauge numbers.

Referring now to FIG. 5, an example of a typical electrical connection between conductor housing 60 (or 70), attached to tractor 52 (or trailer 64), and umbilical cord 74 is shown. Connector housing 60, 70 typically includes a socket cover 116 connected to housing 60, 70 by hinged connection 118, which is biased such that cover 116 provides an environmentally and mechanically protecting seal over socket 114 when not in use. Socket 114 is configured complementarily to connector 78 such that connector 78 may be received within socket 114 when cover 116 is lifted to expose socket 114. Cover 116 also typically includes a projection 120 which is operable to contact protrusion 80 of connector 78, which, under the normal bias of cover 116 provided by hinged connection 118, acts to retain connector 78 within socket 114, thereby maintaining electrical connection therebetween.

FIG. 6 shows a cross-section, taken along section lines 6—6 of FIG. 5, of the electrical connection between connector 78 and socket 114. Socket 114 includes seven "pins" or electrical terminals which are typically configured in accordance with SAE J-560 standards, and which are received within corresponding receptacle terminals of connector 78. Thus, pin 122, corresponding to the white wire of the tractor electrical system 56, is connected to terminal 84 of connector 78, pin 124, corresponding to the black wire of system 56, is connected to terminal 96 of connector 78, pin 126, corresponding to the yellow wire of system 56, is connected to terminal 94 of connector 78, pin 128, corresponding to the red wire of system 56, is connected to terminal 92 of connector 78, pin 130, corresponding to the blue wire of system 56, is connected to terminal 88 of connector 78, pin 132, corresponding to the green wire of system 56, is connected to terminal 90 of connector 78, and pin 134, corresponding to the brown wire of system 56, is connected to terminal 86 of connector 78.

Recently, technological advances in the tractor/trailer industry have spawned the need for providing the trailer or trailers with additional electrical functions, thereby creating the concept of a "smart trailer". Examples of such functions include anti-lock brakes, electronic suspension control and tire pressure sensing, to name a few, as well as diagnostic control and fault detection of such trailer functions. Thus far, a variety of systems have been developed to provide the electrical infrastructure required to accommodate and operate these additional trailer functions, which has led to further development of new electrical interfaces operable to transmit both electrical power requirements and data communications between tractors and trailers. Examples of some recent electrical interface designs include electronic circuitry for providing data communication and electrical power routing through multiple J-560 type umbilical cord connectors, through newly developed connectors and cables having more than the standard seven conductor connections, and through the existing seven conductor (J-560/J-1067) electrical interface of FIGS. 1–6.

Although provisions for additional connectors and connector pins may be a viable solution in the short term, this approach is generally a costly solution, particularly since the addition of further functions will require the addition of even more connectors and/or connector pins. This approach has the further disadvantage of reducing connector standardization and increasing connector complexity.

An example of one known design utilizing the existing J-560 electrical connector 74 of FIGS. 1–6 to provide data communications and electrical power routing between a tractor and trailer is set forth in U.S. Pat. No. 5,397,924. The design utilizes electronic circuitry to develop a combination multiplexed high speed communication and power link between the tractor and trailer. The design incorporates circuitry for determining whether the tractor is connected, via the J-560 connector, to either a "smart" (multiplexed) trailer or a conventional (non-multiplexed) trailer. If a multiplexed trailer is connected to the tractor, two of the electrical wires within the seven wire J-560 connector are used for serial data communications between the tractor and trailer, and the remaining five provide power and ground connections to the trailer electrical systems. If, on the other hand, a non-multiplexed trailer is connected to the tractor, the seven wire J-560 connector is utilized in the conventional fashion, with each of the two communication wires being switched back to its corresponding conventional configuration so that the tractor electrical system controls the trailer lighting system.

It is generally considered desirable by owners and operators of heavy duty tractor/trailers to maintain use of the universal J-560 connectors, sockets and associated umbilical cord in connecting a tractor to a trailer, regardless of the trailer configuration. Any other arrangement will require tractors to be outfitted with new electrical connection hardware when hauling "smart" trailers. When hauling conventional trailers, the tractor must either additionally maintain its J-560 electrical connection hardware, or each conventional trailer must be outfitted with the new conventional electrical connection hardware. In any event, requiring new electrical connection hardware on either the tractor or trailer may be too costly and/or too inefficient for heavy duty tractor/trailer owners and operators to implement.

If the universal J-560 style electrical connection hardware is to be used to provide an electrical power and communications interface between a tractor and trailer, it must meet several new requirements. First, the interface should include provisions for eliminating, or at least greatly reducing sources of electrical noise such as from electromagnetic interference (EMI). Second, it must be capable of providing adequate electrical power capability between the tractor and trailer while maintaining the capability of operating the trailer lighting functions. For example, the National Highway Transportation and Safety Administration (NHTSA) has recently ruled that all trailers manufactured after March of 1998 must be equipped with a trailer anti-lock brake system (ABS), and that the ABS must have a dedicated power line and a dedicated ground line provided thereto. Third, the interface should have adequate power and communications capability to permit new electrically controlled trailer functions and features to be added without requiring additional electrical connection hardware for either the tractor or trailer.

The first requirement, protection against electrical noise, is not met by known prior art systems utilizing strictly a J-560 style interface between the tractor and trailer, due to the high rate of speed at which data is transferred therebetween. Such electrical noise protection may be accomplished by several techniques such as by using shielded cable, or by providing twisted pair wires in a multiple wire communication system, although doing so would require alteration of the universal J-560 umbilical cord; an end sought to be avoided.

The second requirement, provision of adequate power capability, may not be met by known prior art systems. For example, the system disclosed in U.S. Pat. No. 5,397,924 requires at least two of the seven J-560 conductors for communication purposes. The remaining five conductors may be inadequate for providing power and ground lines to all of the trailer's loads while maintaining control over the trailer's lamp circuits.

The third requirement, provision of adequate power capability for additional trailer features, likewise does not appear to be met by known prior art systems. With at least two of the seven J-560 conductors dedicated to communications in known prior art systems, and in view of the proliferation of new electrically controlled trailer functions, some requiring dedicated power and ground lines provided by the tractor, it appears unlikely that known prior art systems will be equipped to meet future power/ground line requirements.

What is therefore needed is an electrical power and communications link for providing both adequate electrical power transmission and electronic data communications between a tractor truck and trailer. An ideal such link should utilize at most a single dedicated communication line and provide for power switching circuitry associated with each of the tractor and trailer that is adequate to meet power/ground requirements for ABS as well as future electrically controlled trailer functions while maintaining control over all trailer lamp circuits. By utilizing slow data rate communications between tractor and trailer, only one communication line would be required, thereby obviating the need for electrical noise reducing provisions and increasing the number of available electrical conductors for routing of power/ground to the trailer. Such an interface should ideally be designed for use with the universal J-560 electrical connection hardware so that it may be used either as a conventional tractor/trailer interface as described hereinabove or as an electrical interface between a tractor and a "smart" trailer.

SUMMARY OF THE INVENTION

The foregoing drawbacks of the prior art are addressed by the present invention. In accordance with one aspect of the present invention, a power and communications link between a tractor and trailer comprises a first plurality of switching devices each having an input switchable between an electrical line forming part of an electrical system of the tractor and one of an electrical power line and a first communication line, and an output. A tractor control module controls the first plurality of switching devices and has an input/output connected to the first communication line for sending and receiving a communication signal thereon. A second plurality of switching devices each has an input connected to an output of one of the first plurality of switching devices, and an output switchable between an electrical line forming part of a first electrical system of the trailer and one of an electrical line forming part of a second trailer electrical system and a second communication line. A trailer control module controls the second plurality of switching devices and has an input/output connected to the second communication line for sending and receiving a communication signal thereon. The tractor and trailer control modules control the first and second plurality of switching devices respectively to connect the first communication line to the second communication line to form a single communication line between the tractor and trailer control modules, and to route electrical power to the second trailer electrical system.

In accordance with another aspect of the present invention, a method of operating a tractor control module to provide a communication line therefrom to a trailer and a dedicated power line from a tractor electrical power source to the trailer, comprises the steps of: (1) controlling a first switching device associated with the tractor control module and having an output connected to the trailer, to disconnect a first electrical line forming part of a tractor electrical system from an input thereof and connect a communication input/output of the tractor control module to the first switching device input to thereby establish the communication line therethrough; (2) monitoring the communication line; (3) performing steps (4)–(5) if a heartbeat signal is detected on the communication line within a first predetermined time period after establishing the communication line, and otherwise controlling the first switching device to disconnect the communication input/output therefrom and reconnect the first electrical line thereto; (4) controlling a second switching device associated with the tractor control module and having an output connected to the trailer, to disconnect a second tractor electrical system electrical line from an input thereof and connect the tractor electrical power source to the second switching device input to thereby provide the dedicated power line; and (5) monitoring the communication line for trailer diagnostic data.

In accordance with yet another aspect of the present invention, a method of operating a trailer control module to provide a communication line therefrom to a tractor and a dedicated power line connected to a tractor electrical power source to an electrical subsystem of the trailer, comprises the steps of: (1) controlling a first switching device associated with the trailer control module and having an input connected to the trailer, to disconnect a first electrical line forming part of a trailer electrical system from an output thereof and connect a communication input/output of the trailer control module to the first switching device output to thereby establish the communication line therethrough; (2) sending a heartbeat signal on the communication line; (3) thereafter monitoring the communication line; (4) performing step (5) if an acknowledgment signal is detected on the communication line within a first predetermined time period after sending the heartbeat signal, and otherwise controlling the first switching device to disconnect the communication input/output therefrom and reconnect the first electrical line thereto; and (5) controlling a second switching device associated with the trailer control module and having an input connected to the dedicated power line of the tractor, to disconnect a second tractor electrical system electrical line from an output thereof and connect the trailer electrical subsystem to the second switching device output to thereby provide a dedicated electrical power line to the trailer electrical subsystem.

One object of the present invention is to provide communication and power switching circuitry for a tractor and a trailer to permit one line communications therebetween.

Another object of the present invention is to provide such communication and power switching circuitry to permit power and communications to be selectively routed between the tractor and trailer on existing tractor and trailer electrical system lines.

A further object of the present invention is to provide such communications and power switching circuitry operable to provide a simple communications link between a tractor and trailer, and to provide routing of dedicated power and ground circuits to the trailer while maintaining normal trailer electrical functions, all using a standard J-560 electrical connector as the sole electrical connection between the tractor and trailer.

These and other objects of the present invention will become more apparent from the following description of the preferred embodiment.

BRIEF DESCRIPTION OF THE DRAWINGS

FIG. 19 is composed of FIGS. 19A and 19B, wherein FIG. 19A is an assembly drawing of a combination tractor/trailer electrical connector socket and control module housing.

DESCRIPTION OF THE PREFERRED EMBODIMENT

Figure 1:
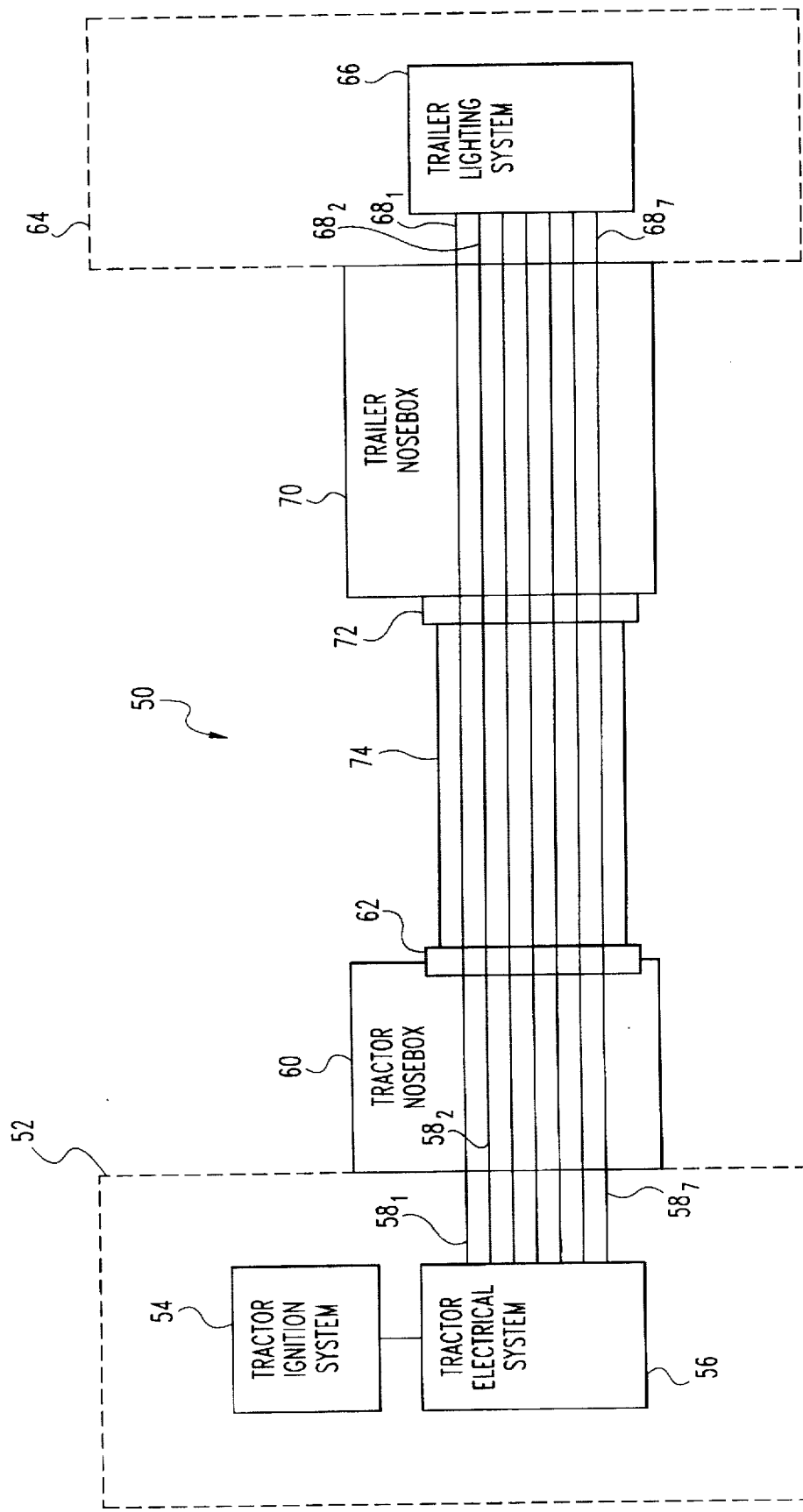
FIG. 1 is a diagrammatical illustration of a prior art electrical interface between a tractor electrical system and a trailer electrical system.
Figure 2:
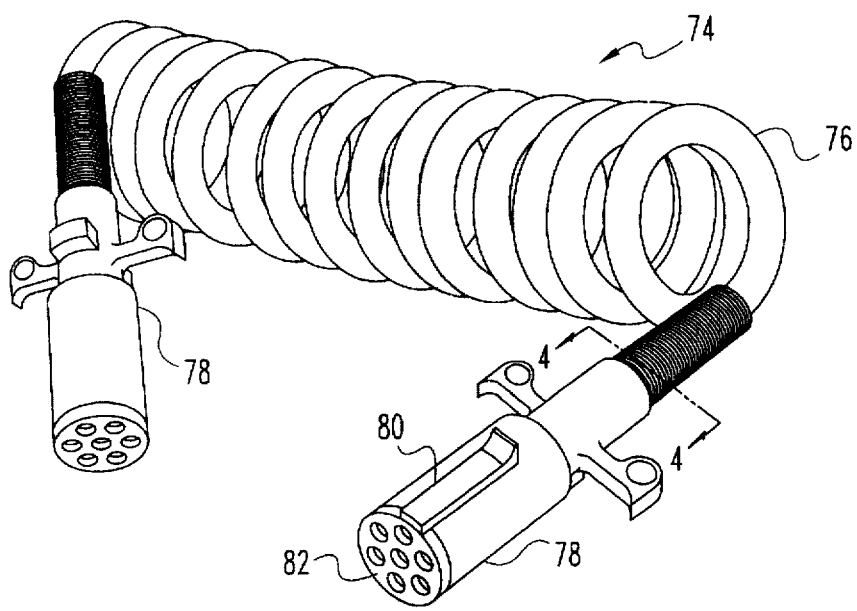
FIG. 2 is a perspective view of a prior art seven conductor electrical cable with connectors for use as an electrical interface between a tractor and a trailer.
Figure 3:
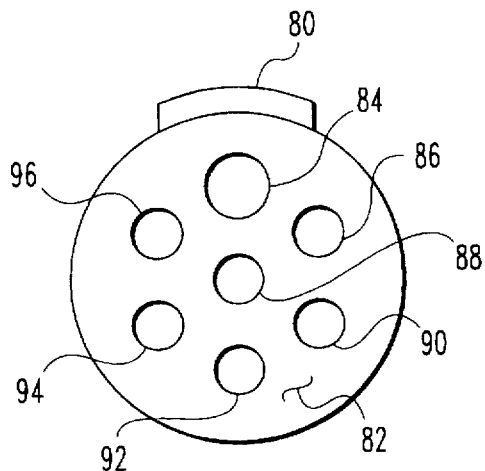
FIG. 3 is a front elevational view of a prior art seven terminal connector for use with the prior art seven conductor electrical cable of FIG. 2.
Figure 4:
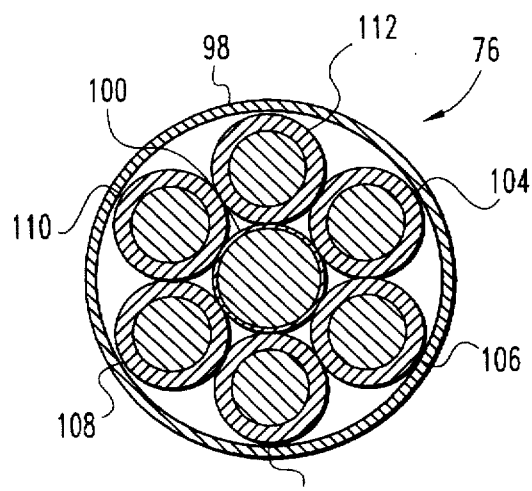
FIG. 4 is a cross sectional view of the prior art electrical cable of FIG. 2 taken along section lines 4—4.
Figure 6:
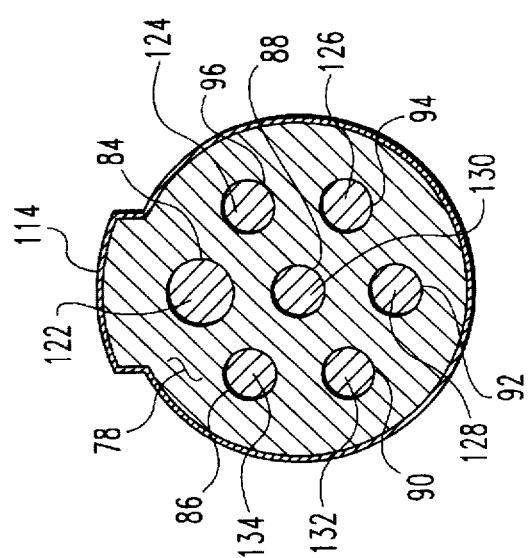
FIG. 6 is a cross-sectional view of the electrical connection of FIG. 5 taken along section lines 6—6.
Figure 5:
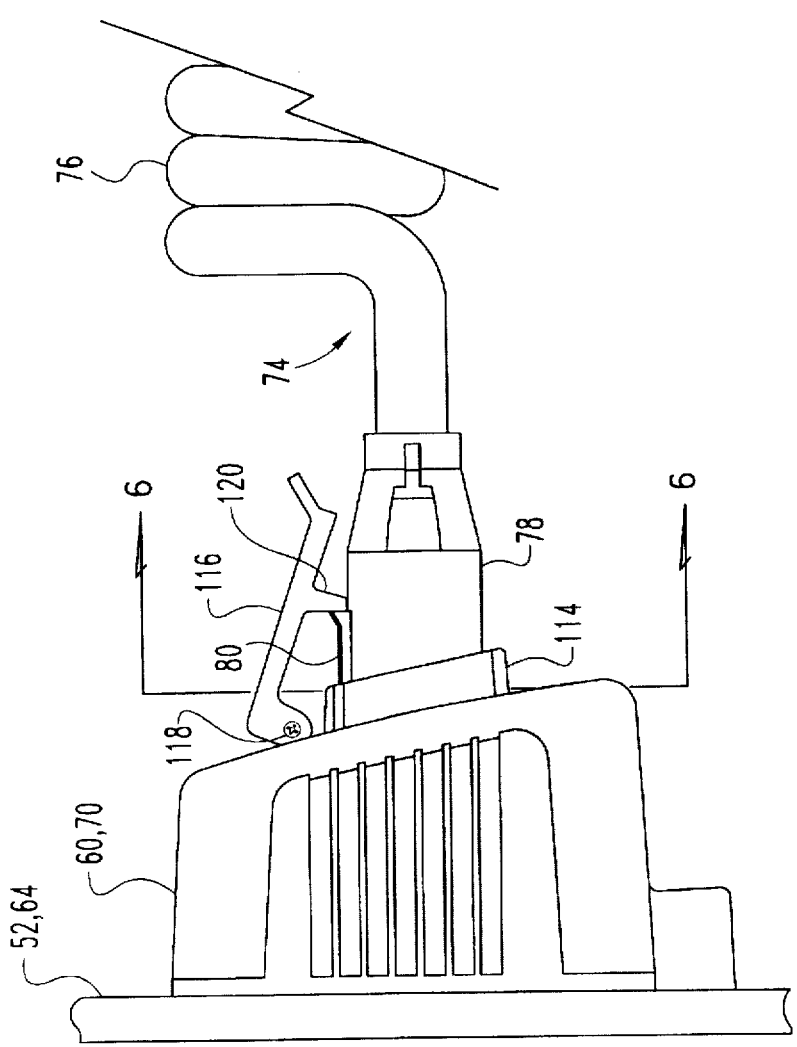
FIG. 5 is a side elevational view of an electrical connection between the prior art seven conductor electrical cable of FIG. 2 and a seven terminal electrical socket of a tractor or trailer.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 7:
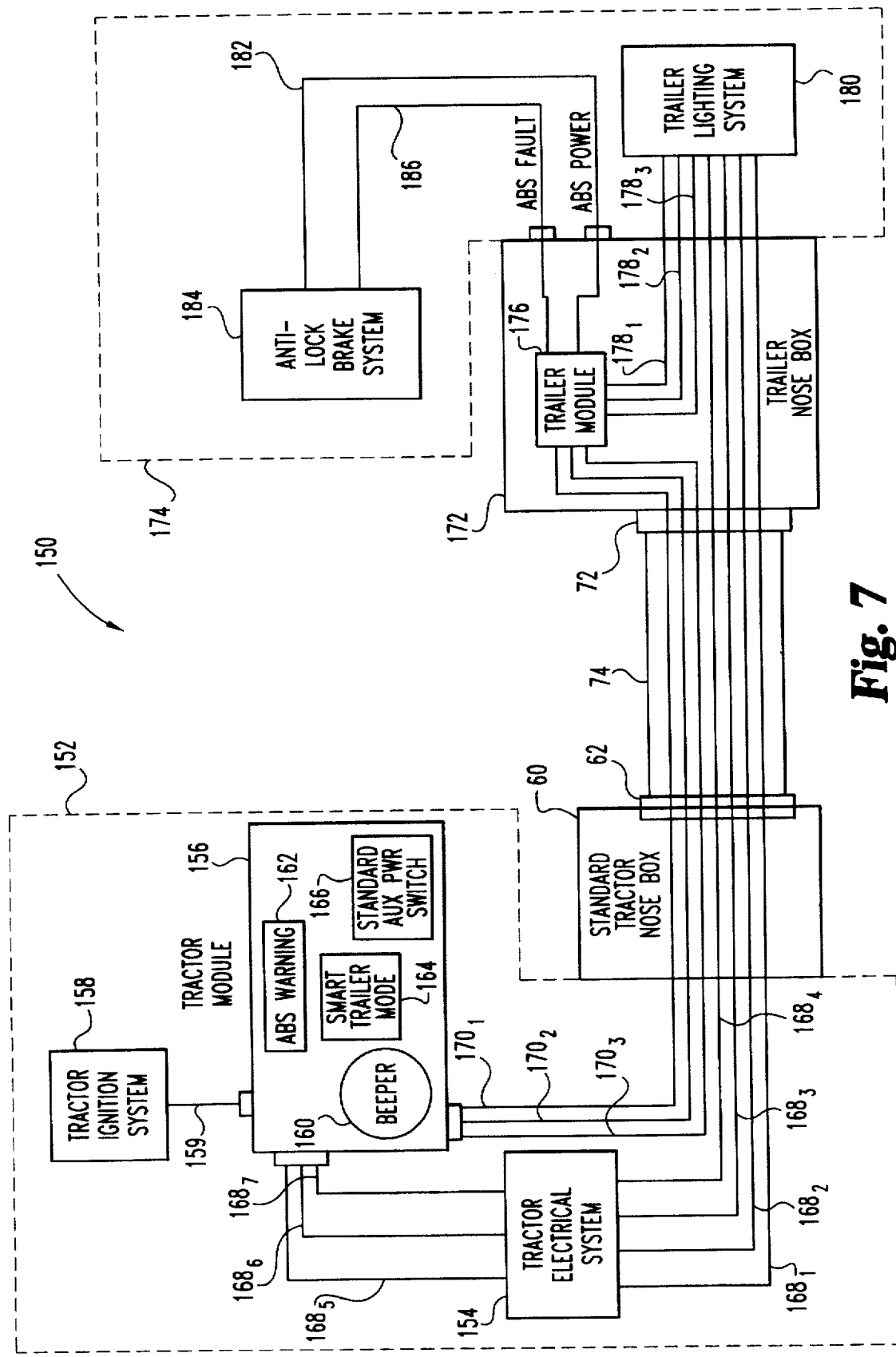
FIG. 7 is a diagrammatical illustration of an electrical power and communications link between a tractor and trailer in accordance with one embodiment of the present invention.

Referring now to FIG. 7, an electrical power and communications link 150 between a tractor and trailer, in accordance with one embodiment of the present invention, is shown. Electrical power and communications link 150 is primarily intended to provide a dedicated electrical power line to an anti-lock brake system (ABS) of the trailer, and provide for the transfer of diagnostic data relating to the ABS back to the tractor. However, those skilled in the art will recognize that link 150 may be used to provide a dedicated power line, as well as diagnostic data transfer capability, to any trailer electrical system such as, for example, an electronic ride control system, tire pressure monitoring system, door status monitoring system, and the like.

Link 150 includes a tractor 152 (represented by a dashed line for illustration purposed) having a tractor electrical system 154 associated therewith. Although tractor electrical systems are generally understood to include engine and powertrain control electronics, entertainment and comfort electronics, body electronics and the like, the term "tractor electrical system" as used herein is defined as the portion of the generally understood tractor electrical system that controls trailer lighting functions including, but not limited to, tail lamps, turn signal lamps, brake lamps, side marker lamps, clearance lamps, trailer dome lamps, license plate lamps.

Four electrical lines of tractor electrical system 154, namely electrical lines $168_1$, $168_2$, $168_3$ and $168_4$, extend into tractor socket housing, or tractor nose box, 60 and are connected to electrical connector, or socket, 62 in a conventional fashion as previously described with respect to FIGS. 1–6. The remaining three electrical lines of the typical seven electrical conductors provided by tractor electrical system 154 (as described with respect to FIG. 1), namely electrical lines $168_5$, $168_6$ and $168_7$, are connected to a trailer control module 156.

Trailer control module 156 includes an electrical circuit control portion and a display portion, and is therefore preferably located in the cab area of the tractor within view of the tractor operator. Trailer control module 156 is powered by tractor ignition system 158 via ignition line 159 such that module 156 receives electrical power, and is therefore operable, when tractor 152 is operable. Tractor module 156 further includes a number of audio and/or visual display indicators such as a Beeper 160, ABS Warning indicator 162, Smart Trailer Mode indicator 164 and Standard AUX Pwr Switch indicator 166. Preferably, Beeper 160 is a piezoelectric device operable to emit an audio signal in response to an excitation signal provided thereto, although Beeper 160 may be any of a variety of known mechanical, electrical, electro-mechanical or other devices operable to emit an audio signal therefrom such as, for example, a bell or chime, a buzzer or a synthesizer operable to emit synthesized tones or voices. Indicators 162–166, on the other hand, are preferably lamp displays operable to provide a lighted indication of a particular event in response to an excitation signal provided thereto. However, the present invention contemplates that indicators 162–166 may be any of a variety of known devices operable to emit a lighted display, or backlight a display, in response to an excitation signal such as, for example, light emitting diodes (LEDs) or vacuum fluorescent (VF) displays.

Tractor control module 156 provides three electrical lines therefrom, namely electrical lines $170_1$, $170_2$ and $170_3$, which extend into tractor nosebox 60 and are connected to electrical connector 62. Thus, electrical lines $168_1$–$168_4$ and $170_1$–$170_3$ provide the seven electrical connections to universal seven terminal connector 62. A universal umbilical cord 74, as described with respect to FIGS. 1–6, connects electrical connector 62 of tractor nosebox 60 to an identically configured electrical connector 72 of trailer electrical connector housing, or nosebox, 172 of trailer 174. Preferably, trailer nosebox 172 is configured to house a trailer control module 176 therein as will be described more fully with respect to FIGS. 19A and 19B, although the present invention contemplates locating trailer control module 176 anywhere within, or attached to, trailer 174.

Electrical lines $168_1$–$168_4$ extend from tractor electrical connector 62 into electrical connector 72 via umbilical cord 74, and from electrical connector 72 into trailer lighting system 180 associated with trailer 174. As used herein, the term "trailer lighting system" is defined as a system of lighting functions typically associated with a trailer, which system is conventionally powered and controlled by the tractor electrical system 154 as described with respect to FIGS. 1–6, and which system typically includes left turn, right turn, brake, tail and clearance/marker lamp circuits, as well as an auxiliary circuit.

Electrical lines $170_1$–$170_3$ extend from tractor electrical connector 62 into trailer electrical connector 72 via umbilical cord 74, and from electrical connector 72 into trailer control module 176. Trailer control module 176 provides electrical lines $178_1$, $178_2$ and $178_3$, which extend from trailer control module 176 into trailer lighting system 180. Thus, electrical lines $168_1$–$168_4$ and $178_1$–$178_3$ provide the seven electrical connections to trailer lighting system 180. Trailer 174 further includes an anti-lock brake system (ABS) 184 which receives electrical power from trailer control module 176 via ABS power line 182. ABS diagnostic data, such as faults and failures associated with the ABS, are provided to trailer module 176 via ABS fault line 186.

Figure 8:
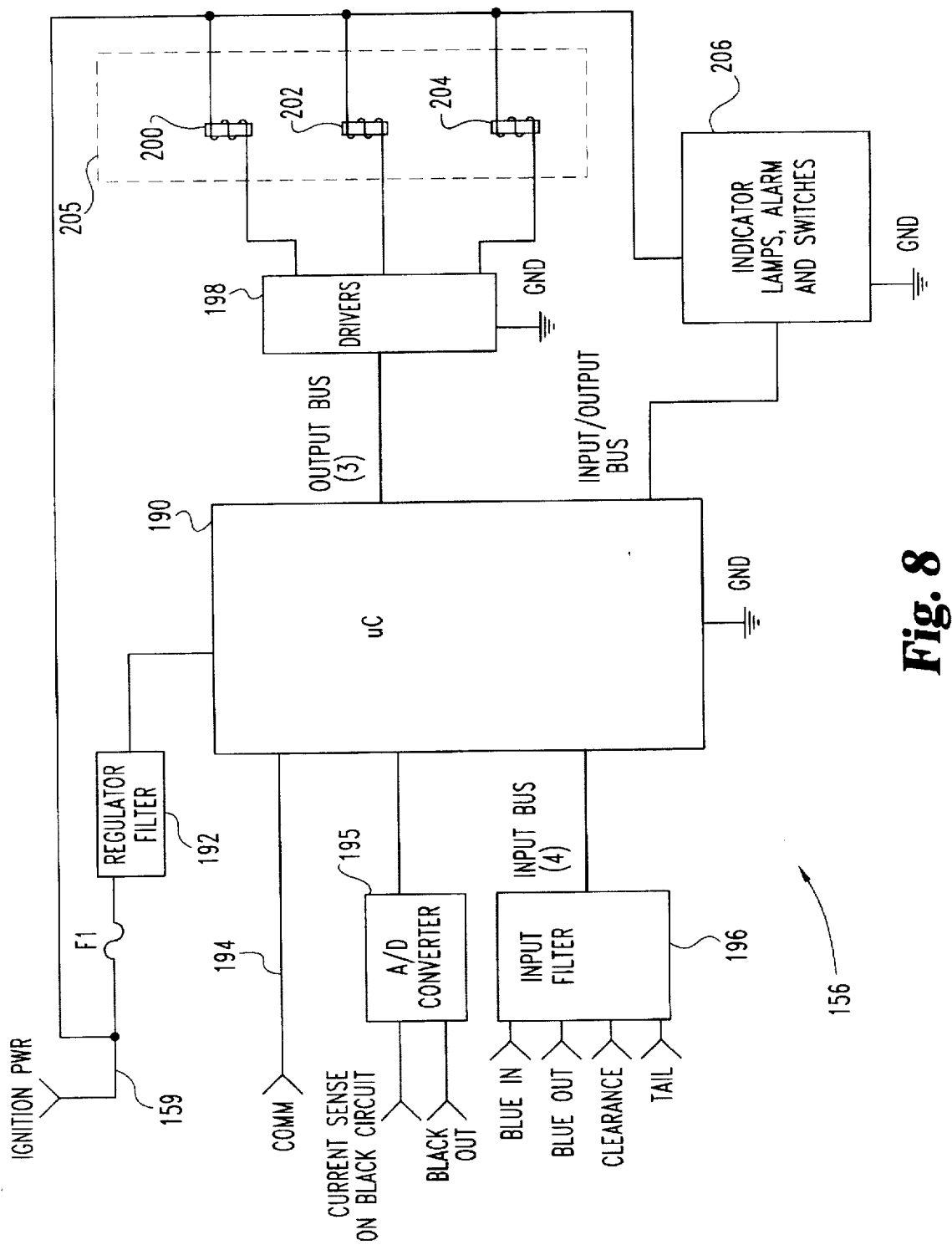
FIG. 8 is a diagrammatical illustration of one embodiment of the tractor module of FIG. 7.

Referring now to FIG. 8, one embodiment of the tractor control module 156, in accordance with the present invention, is shown. Central to tractor control module 156 is computer 190 which is preferably a micro-controller, such as a Microchip 16C54 micro-controller, although the present invention contemplates using any microprocessor-based circuit or module which is capable of executing software algorithms either stored therein or provided thereto, and which is further capable of transmitting and receiving serial data on a single communication line. Micro-controller 190 is powered by tractor ignition line 159 through fuse F1 and regulator filter 192. Regulator filter 192 may be any known device operable to receive ignition voltage from ignition line 159, filter any transients therefrom, and provide a regulated supply voltage to micro-controller 190.

Tractor control module 156 also includes a single communication line, COMM 194, operable to carry serial data to and from micro-controller 190. An analog-to-digital (A/D) converter 195 is also provided and receives an analog current sense signal from the black circuit (see FIG. 10), and provides a digital representation thereof to micro-controller 190. A/D converter also receives an analog voltage from the black circuit (FIG. 10), and provides a digital representation thereof to micro-controller 190. Those skilled in the art will recognize that the foregoing current and voltage sensing features provided by A/D converter may also be provided by a variety of known circuits, and that the A/D converter arrangement described herein does not limit the concepts of the present invention. One example of such circuitry operable to sense current and voltage may comprise a comparator configured as a level sensor operable to provide a signal indicative of a predefined current or voltage level.

Also included with tractor control module 156 is an input filter 196 of known construction which receives status signals BLUE IN, BLUE OUT, TAIL and CLEARANCE (see FIG. 10), and provides the signals to micro-controller 190 via an input bus. An input/output bus extends between micro-controller 190 and an indicator display portion 206 of module 156. The indicators forming display portion 206 are those previously mentioned, namely indicators 160–166, and are powered via tractor ignition line 159.

Micro-controller 190 provides control signals to a known driver circuit 198 via an output bus connected thereto. Driver circuit 198, in turn, preferably drives each of three relays 200, 202 and 204 which, together, form a tractor switching circuit 205 that will be more fully described with respect to FIG. 10. It is to be understood that although relays 200–204 are preferably used in the various embodiments described herein to provide switching between electrical lines, the present invention contemplates that any other known switching devices may be used to provide the switching functions, such as power transistor circuits or other high-current switches, for example.

Figure 9:
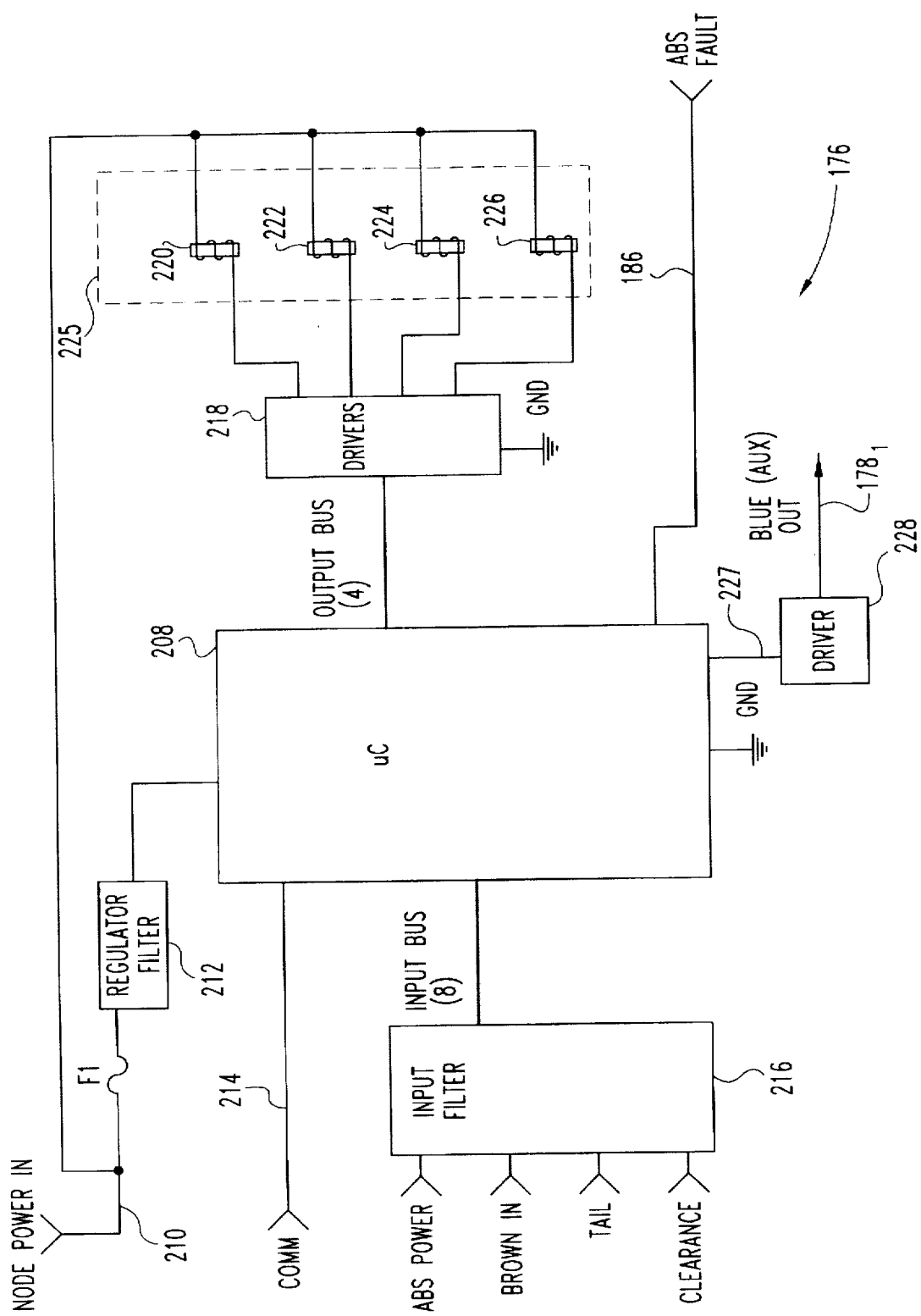
FIG. 9 is a diagrammatical illustration of one embodiment of the trailer module of FIG. 7.

Referring now to FIG. 9, one embodiment of the trailer control module 176, in accordance with the present invention, is shown. As with tractor control module 156, central to trailer control module 176 is computer 208 which is preferably a micro-controller, such as a Microchip 16C54 micro-controller, although the present invention contemplates using any microprocessor-based circuit or module which is capable of executing software programs either stored therein or provided thereto, and which is further capable of transmitting and receiving serial data on a single communication line. Micro-controller 208 is powered by node power line 210, which is provided by the tractor ignition line 159 through umbilical cord 74 as will be described with respect to FIG. 10, through fuse F1 and regulator filter 212. Regulator filter 212 may be identical to regulator filter 194 described with respect to FIG. 8.

Trailer control module 176 also includes a single communication line, COMM 214, operable to carry serial data to and from micro-controller 208. Also included is an input filter 216 of known construction which receives status signals ABS POWER, BROWN IN, TAIL and CLEARANCE (see FIG. 10), and provides the signals to micro-controller 208 via an input bus. Trailer control module 176 also includes a driver circuit 228 connected to auxiliary drive line 227, which driver circuit 228 provides auxiliary output line BLUE OUT $178_1$. A diagnostic input line 186 is also included for providing ABS fault diagnostic data to micro-controller 208.

Micro-controller 218 provides control signals to a known driver circuit 218 via an output bus connected thereto. Driver circuit 218, in turn, preferably drives each of four relays 220, 222, 224 and 226 which, together, form a trailer switching circuit 225 that will be more fully described with respect to FIG. 10. As discussed with respect to tractor switching circuit 205 of FIG. 8, relays 220–226 may be replaced with any of a variety of other known switching devices to provide the switching functions, such as power transistor circuits or other high-current switches, for example.

Figure 10:
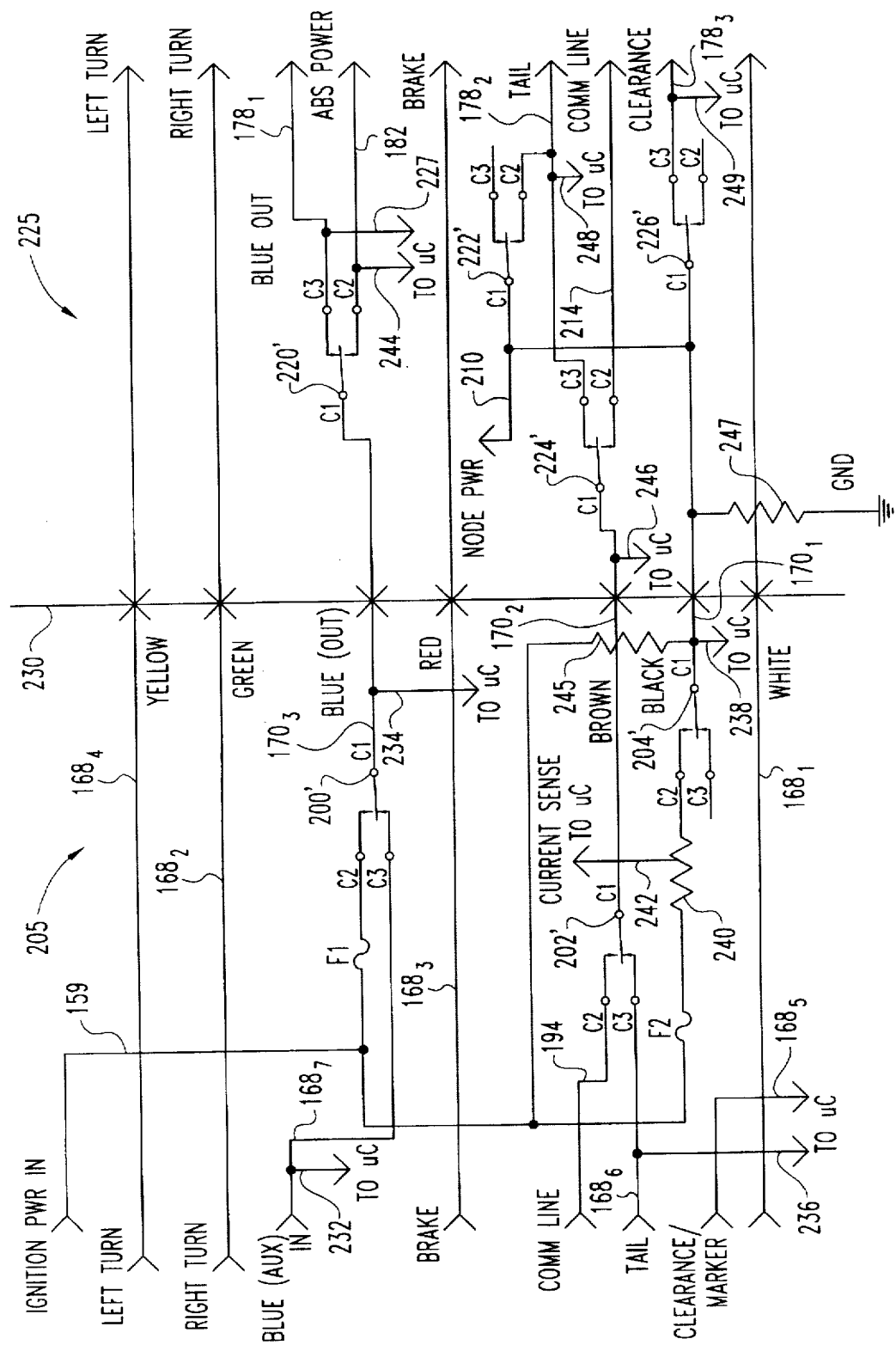
FIG. 10 is an electrical schematic of the electrical power and communication switching circuitry controlled by the tractor and trailer modules of FIGS. 8 and 9.

Referring now to FIG. 10, one embodiment of the electrical power and communication switching circuitry controlled by tractor and trailer modules 156 and 176 is shown. In FIG. 10, tractor switching circuit 205 of FIG. 8 is shown separated from trailer switching circuit 225 of FIG. 9 by solid vertical line 230, which is intended to represent the electrical connection between tractor 152 and trailer 174 provided by universal seven conductor umbilical cord 74. Electrical lines $168_1$–$168_4$, as described with respect to FIG. 7, extend uninterrupted between the tractor 152 and trailer 174. In accordance with SAE J-560 standards, the white electrical line $168_1$ is the ground return to the tractor 152, the green electrical line $168_2$ is the right turn signal circuit, the red electrical line $168_3$ is the brake lamp circuit, and the yellow electrical line $168_4$ is he left turn signal circuit.

Electrical line 168 which is shown in FIG. 7 as extending into tractor module 156, is the black clearance/marker lamp circuit line and is provided as the CLEARANCE input to input filter 196. A first input of switch 204' is connected through the series combination of resistor 240 and fuse F2 to the tractor ignition power line 159. A second input of switch 204' is not connected (open). The output of switch 204' is provided as electrical line $170_1$. Relay 204 of FIG. 8 is controllable by micro-controller 190 to toggle switch 204' between an open position and tractor ignition power line 159. Electrical line $170_1$ is also connected back to the tractor ignition power line 159 through resistor 245. Finally, electrical line $170_1$ is connected to A/D converter 195 via sense line 238.

One purpose of resistor 240 is to provide a means for sensing current flowing through switch 204', which is preferably accomplished via current sense line 242 extending from resistor 240 and connected to the input of A/D converter 195 (FIG. 8). The present invention further contemplates that the foregoing current sensing function may alternatively be accomplished by other known current sensing techniques such as inductively coupling to the output of switch 204', for example, in which case resistor 240 may be omitted from switching circuit 205. Resistor 245 is provided as a means for sensing the voltage of electrical line $170_1$ as will be described hereinafter.

Electrical line 1701 is provided to trailer switching circuit 225 via umbilical cord 74 to provide the node power line 210 to trailer control module 176. Node power line 210 (electrical line $170_1$) is further connected to the input of switch 222', the input of switch 226' and to one end of a resistor 247, the opposite end of which is connected to ground. Resistor 247 is used in conjunction with resistor 245 to provide a voltage sensing feature of electrical line $170_1$ under certain conditions to be described more fully hereinafter. Preferably, resistor 245 is set at approximately 20 kohms and resistor 247 is set at approximately 10 kohms, although the present invention contemplates setting resistors 245 and 247 at any desired value and/or resistor ratio.

A first output of switch 222' is unconnected (open) and a second output is connected to the tail lamp circuit line $178_2$ of the trailer lighting system 180. The second output of switch 222' is also connected to the TAIL input of input filter 196 via status line 248. A first output of switch 226' is similarly unconnected (open) and a second output is connected to the black clearance lamp circuit line $178_3$ of the trailer lighting system 180. The second output of switch 226' is also connected to the CLEARANCE input of input filter 196 via status line 249. Relays 222 and 226 of FIG. 9 are controllable by micro-controller 208 to toggle switch 222' between an open position and electrical line $178_2$, and switch 226' between an open position and electrical line $178_3$, respectively.

Electrical line $168_6$, which is shown in FIG. 7 as extending into tractor module 156, is the brown tail lamp circuit line and is connected to a first input of switch 202'. The first input of switch 202' is also connected to the TAIL input of input filter 196 via status line 236. A second input of switch 202' is connected to the COMM line 194 of micro-controller 190. The output of switch 202' is provided as electrical line $170_2$. Relay 202 of FIG. 8 is controllable by micro-controller 190 to toggle switch 202' between electrical line 1686 and COMM line 194

Electrical line $170_2$ is provided to trailer switching circuit 225 via umbilical cord 74, and is connected to the input of switch 224'. The input of switch 224' is also connected to the BROWN IN input of input filter 216 via status line 246. A first output of switch 224' is connected to electrical line $178_2$ (tail lamp circuit line) and a second output of switch 224' is connected to the COMM line 214 of micro-controller 208. Relay 224 of FIG. 9 is controllable by micro-controller 208 to toggle switch 224' between electrical line $178_2$ and COMM line 214.

Electrical line $168_7$, which is shown in FIG. 7 as extending into tractor module 156, is the blue auxiliary circuit line and is connected to a first input of switch 200'. The first input of switch 200' is also connected to the BLUE IN input of input filter 196 via status line 232. A second input of switch 202' is connected to the tractor ignition power line through fuse F1. The output of switch 200' is provided as electrical line $170_3$. The output of switch 200' is also connected to the BLUE OUT input of input filter 196 via status line 234. Relay 200 of FIG. 8 is controllable by micro-controller 190 to toggle switch 200' between electrical line $168_7$ and the tractor ignition power line 159.

Electrical line $170_3$ is provided to trailer switching circuit 225 via umbilical cord 74, and is connected to the input of switch 220'. A first output of switch 220' is connected to electrical line 182, which is the ABS power line for supplying electrical power to ABS 184. The first output of switch 220' is also connected to the ABS POWER input of input filter 216 via status line 244. A second output of switch 220' is connected to the BLUE OUT auxiliary electrical line $178_1$. The second output of switch 220' is also connected to micro-controller 208 via electrical line 227. Relay 220 of FIG. 9 is controllable by micro-controller 208 to toggle switch 220' between electrical line $178_1$ and ABS power line 182.

Switches 200', 202', 204', 220', 222', 224' and 226' are shown in FIG. 10 in their default positions. In other words, prior to initially powering up tractor control module 156, switch 200' connects electrical line 168 to electrical line $170_3$, switch 202' connects electrical line $168_6$ to electrical line $170_2$, and switch 204' connects electrical line $170_1$ to an open position. Similarly, prior to powering up trailer control module 176, switch 220' connects electrical line $170_3$ to electrical line $178_1$, switches 222' and 226' are each in the open position, and switch 224' connects electrical line $170_2$, to electrical line $178_2$. Thus, with the exception of clearance/marker electrical line $168_5$, the tractor electrical system 154 is connected to the trailer lighting system 180 in a conventional manner as described with respect to FIGS. 1–6 and as set forth in SAE J-560.

Upon initially powering up tractor control module 156, micro-controller 190 executes a software algorithm to determine whether a trailer control module 176 is connected thereto (described with respect to FIG. 20) and, if so, sends a control signal to circuit 206 to illuminate the "Smart Trailer Mode" display 164 of module 156, and controls switches 202' and 204' accordingly. Switch 204' is controlled to connect the tractor ignition power line 159 to electrical line $170_1$, switch 202' is controlled to connect the COMM line 194 to electrical line $170_2$ and switch 200' is controlled to connect the tractor ignition power line 159 to electrical line $170_3$.

When tractor control module 190 connects tractor ignition power line 159 to electrical line $170_1$, electrical power from the tractor ignition system 158 is supplied to the node power input of micro-controller 208, thereby "waking up" trailer control module 176. After initializing trailer control module 176, micro-controller 208 executes a software algorithm to establish communications with, and periodically determine the existence of, tractor control module 156. The algorithm to periodically determine the existence of tractor control module 156 is described with respect to FIG. 21. In establishing communications with tractor control module 156, micro-controller 208 controls switch 224' to connect electrical line 170₂ (COMM line 194) to the COMM line 214 to thereby establish a single communication line between the trailer control module 176 and tractor control module 156. Micro-controller 208 thereafter controls switch 220' to connect electrical line 170₃ to ABS power line 182, thereby providing a dedicated electrical power line from tractor ignition power line 159 and the ABS.

Micro-controller 190 and micro-controller 208 thereafter each execute a communication software algorithm to simultaneously monitor the status of each of the input lines to input filters 196 and 216, the status of the BLUE OUT auxiliary line 178₁, and gather diagnostic (fault) data relating to ABS 184. For example, Micro-controller 190 monitors status line 236, and informs micro-controller 208, via COMM line 194 to COMM line 214, of a request to turn on the tail lamp circuit. Preferably, this is accomplished by monitoring the voltage on line 236, and when tail lamp operation is requested, either manually by the tractor operator or via some automatic lighting means, the voltage change on line 236 is sensed and the tail lamp request signal is sent, via COMM line 194, to trailer control module 176. When trailer control module 176 receives such a request via COMM line 214, micro-controller 208 controls switch 222' to connect the node pwr line 210 to electrical line 178₂, thereby providing electrical power to the tail lamp circuit. Status lines 236 and 248 are thereafter monitored for a request to turn off the tail lamp circuit, which is accomplished be opening switch 222'.

In a similar fashion, micro-controller 190 monitors status line 168₅, and informs micro-controller 208 of a request for clearance/marker lamp operation. When micro-controller 208 of trailer control module 176 receives such a request via COMM line 214, switch 226' is controlled to connect the node pwr line 210 to electrical line 178₃, thereby providing electrical power to the clearance/marker circuit. Status lines 168₅ and 249 are thereafter monitored for a request to turn off the clearance/marker lamp circuit, which is accomplished be opening switch 226'. Similarly, micro-controller 190 monitors status line 232, and informs micro-controller 208 of a request for operation of any auxiliary electrical circuit connected to the BLUE OUT electrical line 178₁. Examples of such auxiliary electrical circuits include door ajar, electronic suspension control, dome lamp, license plate lamp, or other trailer electrical circuits. In response to such a request, micro-controller 208 controls driver 228 to provide electrical power on electrical line 178₁, and micro-controller 190 sends a control signal to circuit 206 to illuminate the "Standard AUX Pwr Switch" display 166 of module 156. Alternatively, the "Standard AUX Pwr Switch" area 166 of module 156 may comprise a plurality of switches operable to actuate a corresponding function within the trailer 174. For example, one such switch forming a portion of area 166 may be a dome lamp switch operable to control a dome lamp within the trailer 174. In such a case, micro-controller 190 is operable to monitor the status of any such switch and communicate a request for the corresponding function to the trailer control module 176, which is operable to carry out the requested action.

Micro-controller 208 also monitors the ABS fault line 186 and sends an ABS warning signal to micro-controller 190, via COMM line 214, if such an ABS fault occurs within ABS 184. Upon receiving such an ABS warning signal via COMM line 194, micro-controller 190 sends a control signal to circuit 206 to illuminate the "ABS Warning" lamp 162 and actuate Beeper 160. Status lines 234 and 244 are continuously monitored to determine the status of the ABS power line 182, and beeper 160 is actuated in response to any interruption in ABS power.

Figure 11:
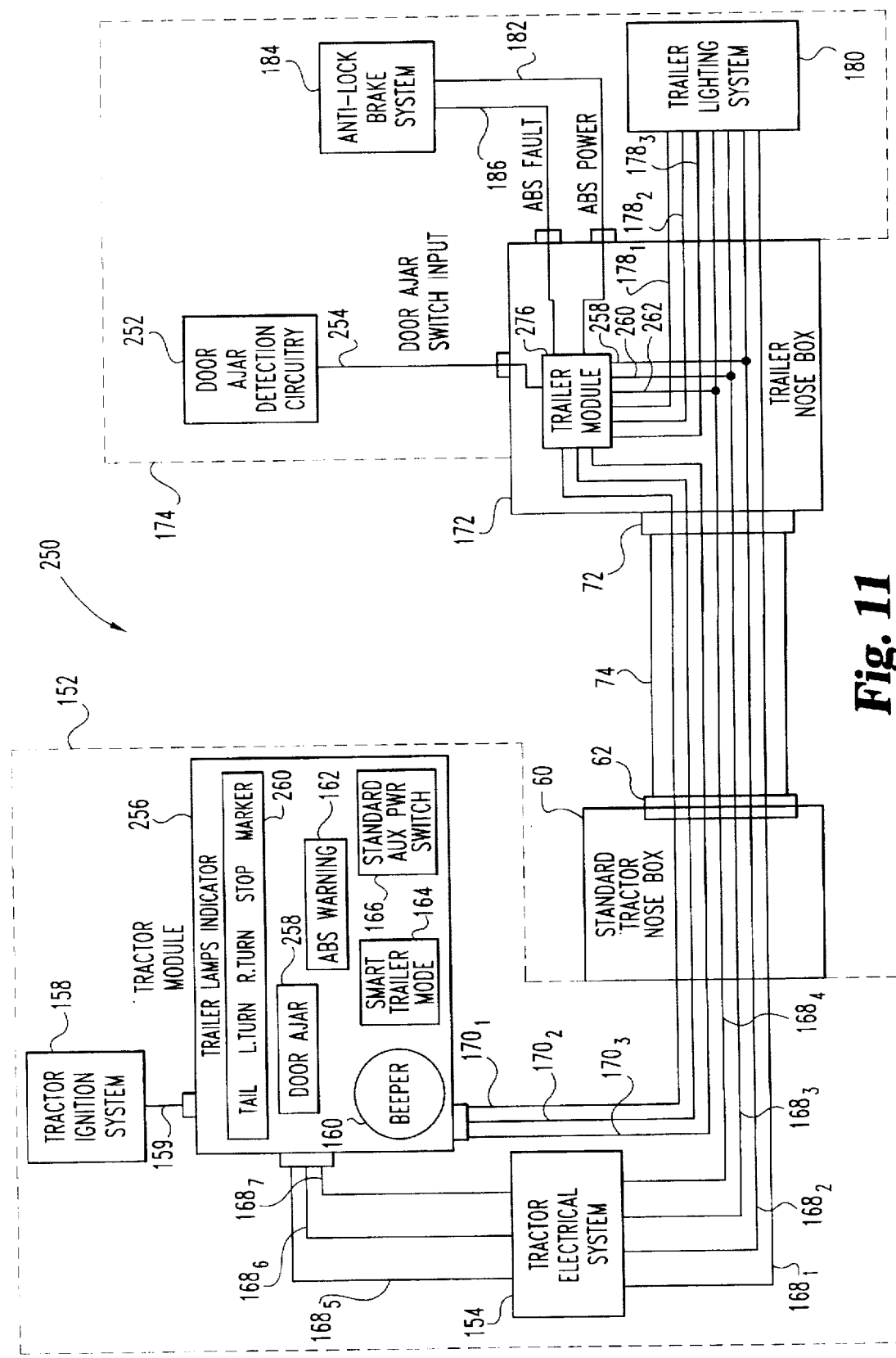
FIG. 11 is a diagrammatical illustration of an electrical power and communications link between a tractor and trailer in accordance with another embodiment of the present invention.
Figure 12:
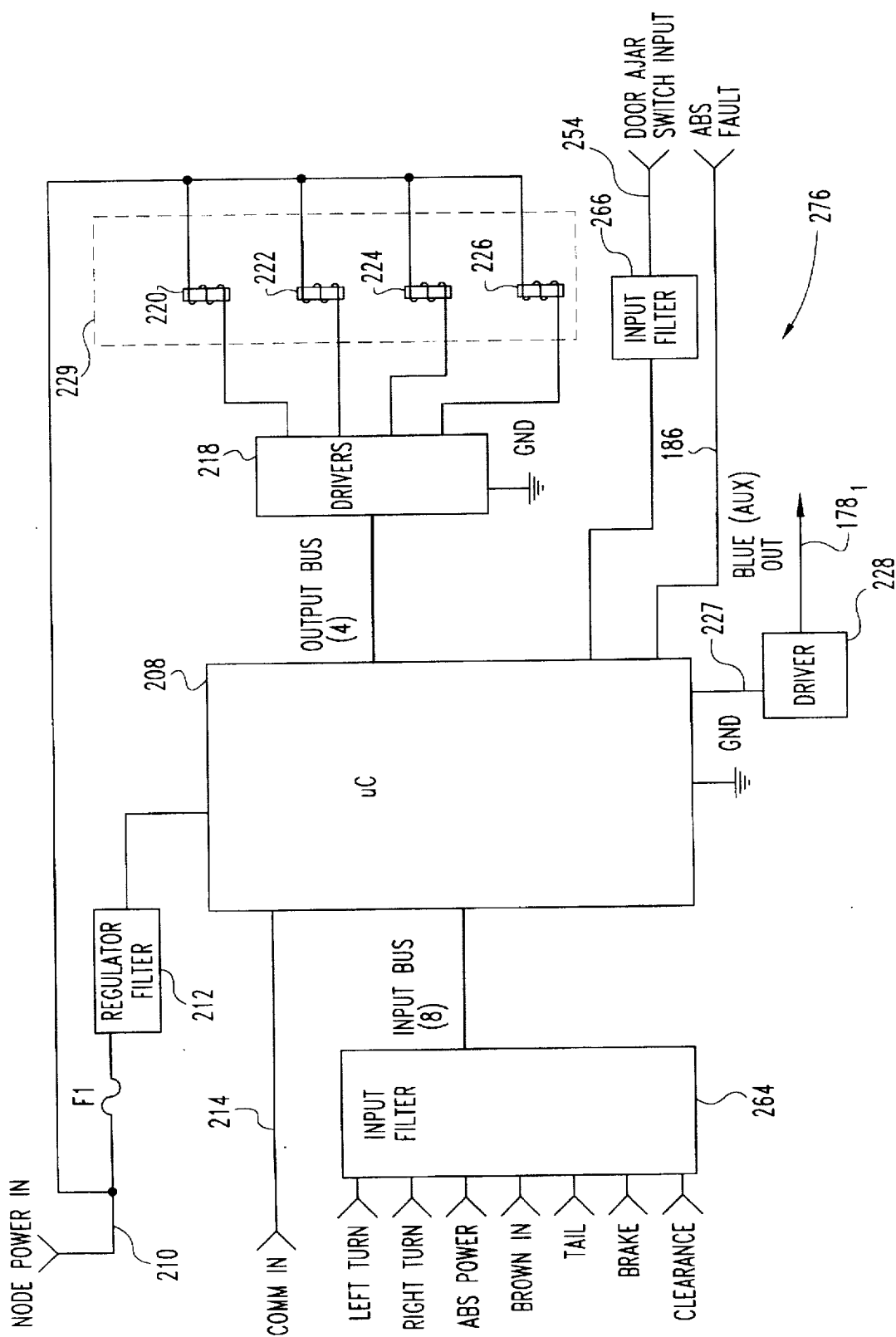
FIG. 12 is a diagrammatical illustration of one embodiment of the trailer module of FIG. 11.
Figure 13:
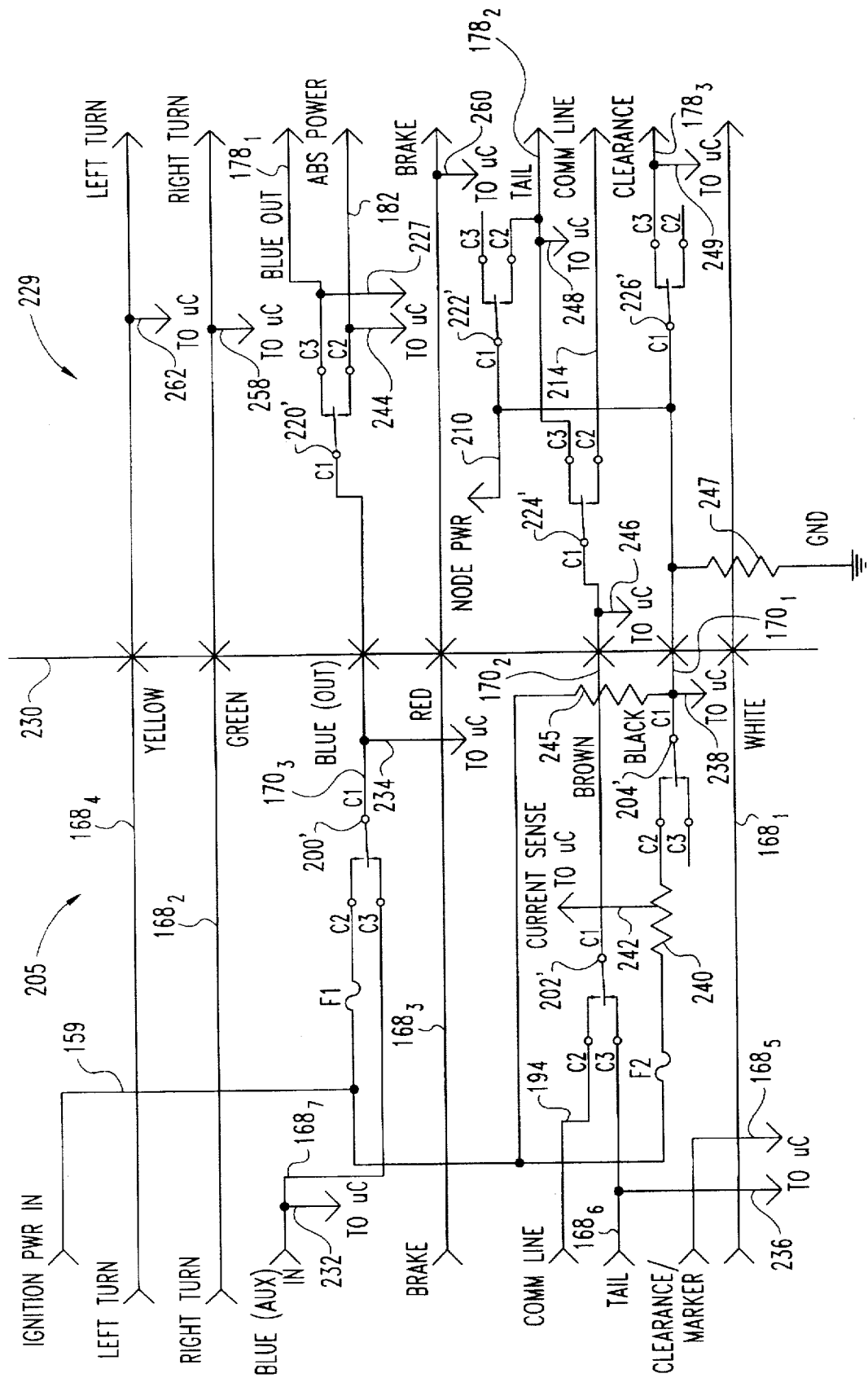
FIG. 13 is an electrical schematic of the electrical power and communication switching circuitry controlled by the tractor and trailer modules of FIGS. 8 and 11.

Referring now to FIGS. 11–13, an electrical power and communications link 250 between a tractor and trailer, in accordance with another embodiment of the present invention, is shown. Electrical power and communications link 250 is substantially similar to electrical power and communications link 150 shown and described with respect to FIGS. 7–10, and like numbers are therefore used to represent like elements. Unlike link 150, the trailer includes a door ajar detection circuit, and the trailer control module is operable to provide further diagnostic and trailer lighting system information to the tractor control module via serial communications therebetween. The tractor control module also includes added display capability for providing the tractor operator with the further diagnostic and trailer lighting information.

Referring to FIG. 11 in particular, tractor 152 includes a tractor control module 256 connected to the tractor ignition system 158 via tractor ignition power line 159. Tractor electrical system 154 is connected to electrical connector 62 exactly as described with respect to FIG. 7, and is also connected to tractor control module exactly as described with respect to tractor control module 156. Tractor control module 256, like tractor control module 156, includes display elements 160–162, and further includes a door ajar display 258 as well as a trailer lighting display 260. Displays 258 and 260 are preferably constructed identically as described with respect to displays 162–166.

Trailer nose box 172 includes a trailer module 276 which is identical in most respects to trailer control module 176. For example, trailer control module 276 is connected to electrical connector 62 through electrical connector 72 in exactly the same manner as described with respect to trailer control module 176. Further, trailer control module 276 is connected to trailer lighting system 180 and to ABS 184 exactly as previously described. Unlike trailer control module 176, however, status lines 258, 260 and 262 of trailer control module 276 are connected to electrical lines 168₂, 168₃ and 168₄ respectively. Trailer 174 also includes door ajar detections circuitry 252, which is connected to trailer control module 276 via electrical line 254. Preferably, circuitry 252 is constructed from a single switch which is closed when the corresponding trailer door is properly closed, and is otherwise open, although the present invention contemplates that circuitry 252 may be constructed of more sophisticated circuitry as is known in the art. Circuitry 252 may be attached to any door(s) associated with the trailer, such as a rear or side rolling or double doors, it being understood that door ajar detection circuitry 252 may be provided at a number of such doors and that an equal number of circuitry lines 254 may be provided to trailer control module 276 to monitor all such doors.

The internal structure of tractor control module 256 is preferably identical to tractor control module 156 of FIG. 8, and the description thereof applies equally to tractor control module 256. Referring now to FIG. 12, a preferred embodiment of trailer control module 276 is shown. Trailer control module 276 is identical to trailer control module 176 with the following exceptions. First, input filter 264 is provided with additional inputs LEFT TURN, RIGHT TURN and BRAKE. Second, door ajar switch input 254 is applied to a known input filter 266, which provides micro-controller 208 with a filtered door ajar switch signal. Finally, trailer switching circuit 229 is configured somewhat differently as shown in FIG. 13.

Referring now to FIG. 13, tractor switching circuit 205 (previously described with respect to FIG. 10) is shown connected to trailer switching circuit 229 via connection 230. Trailer switching circuit 229 is identical in most respects to trailer switching circuit 225, and like numbers are therefore used to identify like elements. Trailer switching circuit further includes status line 262 connected to electrical line $168_4$, which provides the LEFT TURN input to input filter 264, status line 258 connected to electrical line $168_2$, which provides the RIGHT TURN input to input filter 264, and status line 260 connected to electrical line $168_3$, which provides the BRAKE input to input filter 264. In all other respects, trailer switching circuit 229 is identical to trailer switching circuit 225.

Operationally speaking, electrical power and communications link 250 is substantially identical to that previously described with respect to link 150. In addition to the previously described operation, however, micro-controller 208 is further operable during execution of the communication software algorithm to monitor status lines 258, 260 and 262, and to monitor the door ajar switch input 254 provided by input filter 266. Preferably, status lines 258–262 are operable as previously described with respect to the existing status lines, so that if LEFT TURN lamp operation of trailer lighting system 180 is detected by micro-controller 208, an appropriate data signal signal is sent on COMM line 214. The LEFT TURN lamp status signal is received on COMM line 194 of micro-controller 190, which then sends a control signal to drive circuit 206 to thereby illuminate the left turn indicator portion of display 260. In a similar fashion, RIGHT TURN, BRAKE, TAIL, and CLEARANCE/MARKER lamp operation can be detected at status lines 258, 260, 248 and 249 respectively, and displayed on display 260. Finally, the status of door ajar switch 252, provided to micro-controller 208 via input filter 266, is monitored and, if a door ajar event is detected, micro-controller 208 sends a corresponding data signal on COMM line 214. Micro-controller 190 receives the door ajar data signal on COMM line 194, and provides an appropriate control signal to drive circuitry 206, thereby illuminating door ajar indicator 258 of tractor control module 256.

Referring now to FIGS. 14–17, an electrical power and communications link 300 between a tractor and trailer, in accordance with yet another embodiment of the present invention, is shown. Electrical power and communications link 300 is substantially similar to electrical power and communications link 250, and like numbers are therefore used to represent like elements. The main difference between link 300 and link 250 is the separation of the previously described tractor control module into a tractor display module 302, preferably located in the cab area of the tractor 152, and a tractor control module 318 associated with tractor electrical connector housing, or nosebox, 320. It is to be understood that any of the previously described tractor modules 156 and/or 256 may likewise be separated into a display module and control module, and that any such control module may be located within an appropriately configured nosebox, as will be described in greater detail with respect to FIGS. 19A and 19B.

Tractor display module 302 includes the previously discussed indicators 160–166 and 258–260, as well as additional indicators "Dome Switch" 304, "Refer Fault" 306 and indicator bar 308 including a "Back Up" indicator and four AUX indicators. Tractor 152 may include a reverse gear detector 310, which is preferably a switch operable in a first position to indicate a reverse gear condition of tractor 152, and in a second position otherwise, and which is provided as an input to display module 302. Preferably, display module 302 includes a micro-processor based controller (not shown) operable to communicate, in serial data fashion, with a micro-controller of tractor control module 318. When reverse gear detector 310 indicates that tractor 152 is in a reverse gear condition, the controller of display module 310 sends a control signal to an appropriate drive circuit (not shown), thereby illuminating the "Back Up" portion of indicator bar 308. Display module 302 further includes a power/communications port having an electrical power line 312, a ground reference line 314 and a communications line 316 extending therefrom. Electrical power and ground reference lines 312 and 314 are connected (not shown)to tractor ignition power line 159 to thereby provide tractor ignition electrical power and ground to tractor module 318. Communication line 316 is preferably connected to serial data communication ports of the tractor display module 302 and tractor control module 318 respectively, so that serial communication signals can be sent therebetween. It is to be understood, however, that if no wiring harness constraints exist, communication between tractor display module 302 and tractor control module 318 may be carried out in parallel format, as is known in the art. Finally, tractor display module 302 may optionally include a number of inputs 315 (two such inputs are shown) for monitoring a corresponding number of tractor functions, which functions may be displayed with display module 302 and/or may be provided to tractor control module 318 via communications line 316. An example of one such optional input is the reverse gear detector 310 previously discussed. Another example of an optional input 315 is a gear indication detector input, so that display module 3022 may display the current transmission gear. Those skilled in the art will recognize that the status of any such tractor function may be provided as an input 315 to display module 320 for display thereon, or to be further provided to tractor module 318 via communication line 316.

Tractor control module 318 has electrical lines $168_4$–$168_7$ of tractor electrical system 154 connected thereto, and has electrical lines $170_1$–$170_4$ extending therefrom and connected to electrical connector 62 as previously described. Electrical lines $168_1$–$168_3$ extend from tractor electrical system 154 and are connected to electrical connector 62 as previously described. Electrical lines $168_2$ and $168_3$ are further connected to tractor control module 318 via status lines 386 and 384 respectively. As with electrical power and communications links 150 and 250, link 300 thus provides a total seven electrical connections to electrical connector 62, which is preferably done so in SAE J-560 format.

Tractor nose box 320 may optionally include provisions for receiving large gauge power 322 and ground 324 lines from the tractor ignition system 158. Such large gauge power 322 and ground 324 wires are capable of carrying large amounts of current so that sufficient current may be supplied to trailer 174 via electrical lines $168_1$–$168_4$ and $170_1$–$170_4$. Tractor nose box 320 is connected to trailer nose box 326 via universal umbilical cord 74 as with the previously described electrical power and communication links.

Trailer nose box 326 includes a trailer control module 328 therein, which module 328 has electrical lines $170_1$–$170_4$ connected thereto, and electrical lines $178_1$–$178_4$ extending therefrom and connected to trailer lighting system 180. Electrical lines $168_1$–$168_3$ extend through nosebox 326 and are also connected to trailer lighting system 180 as previously described. Electrical lines $168_2$ and $168_3$ are further connected to trailer control module 328 via status lines 396 and 394 respectively. As with previously described trailer control modules, module 328 is connected via ABS power line 182 to ABS 184. ABS 184 provides an ABS fault signal to module 328 via signal path 186, and door ajar switch 252 provides a door ajar signal to module 328 via signal path 332.

In addition to the above, trailer 174 includes a number of additional trailer electrical systems which may need electrical power routed thereto and/or which may provide diagnostic data to trailer control module 328. For example, trailer 174 may include a refrigeration unit which may be connectable to a source of power via trailer control module 328, and which includes diagnostic circuitry for detecting refrigeration unit faults or failures and providing a refrigeration fault signal "REFER Fault" to trailer module 328 via signal path 330. As another example, trailer 174 may include dome lights 333 requiring electrical power routed thereto via electrical line 334. Finally, trailer 174 may include back up lights 335 requiring electrical power routed thereto via electrical line 336. Those skilled in the art will recognize that other trailer electrical systems may be associated with trailer 174, and that one or more of the embodiments of the present invention may be configured to route electrical power thereto, and/or monitor any such electrical system for diagnostic information. Trailer control module 328 may also include a number of auxiliary inputs 338 connected thereto for monitoring any of a corresponding number of trailer functions. Further, trailer nose box 340 may optionally include a node power electrical line 340 extending therefrom for providing node electrical power to further electrical systems within forming part of trailer 174. Finally, trailer nose box 328 may also include a node communications line 370 extending therefrom, which may be used to provide for communications between trailer module 328 and one or more electrical systems forming a part of trailer 174.

Figure 15:
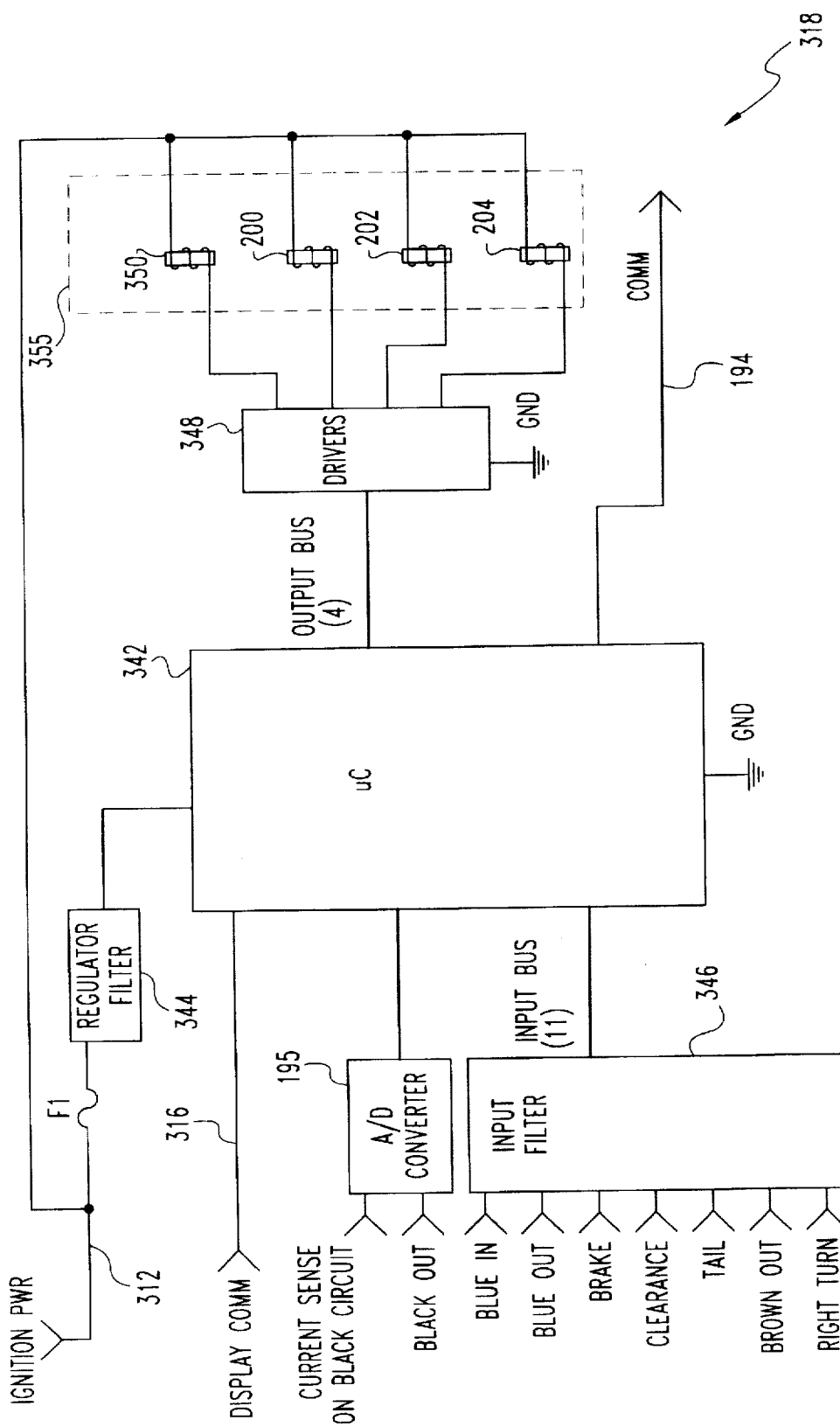
FIG. 15 is a diagrammatical illustration of one embodiment of the tractor module of FIG. 14.

Referring now to FIG. 15, one embodiment of tractor control module 318, in accordance with the present invention, is shown. As with the tractor control module embodiment discussed previously, module 318 includes a micro-controller 342 receiving electrical ignition power through a fuse F1 and a regulator filter 344 via ignition power line 312 (or optionally via large gauge power line 322). A communication line 316 is connected to micro-controller 342 to provide a serial communication path between tractor control module 318 and tractor display module 302. An A/D converter 195 is connected to micro-controller 342 and receives a current signal input and a voltage signal input thereto as previously described with respect to FIG. 8. An input filter 346 is connected to micro-controller 342 and, in addition to those inputs described with respect to the input filter 196 of FIG. 8, includes as inputs thereto BRAKE, BLACK OUT, BROWN OUT, RIGHT TURN, GREEN OUT and LEFT TURN. As with the tractor control module embodiment discussed previously, a driver circuit 348 is connected to an output bus of micro-controller 342, and driver circuit 348 is operable to drive a number of switching devices forming a tractor switching circuit 355, where the switching devices are preferably relays, although may be other switching devices. In the present embodiment, four such relays 350, along with previously discussed relays 200, 202 and 204, are connected to driver circuitry 348. Finally, the communication line COMM 194 is connected to micro-controller 342 as previously discussed.

Figure 14:
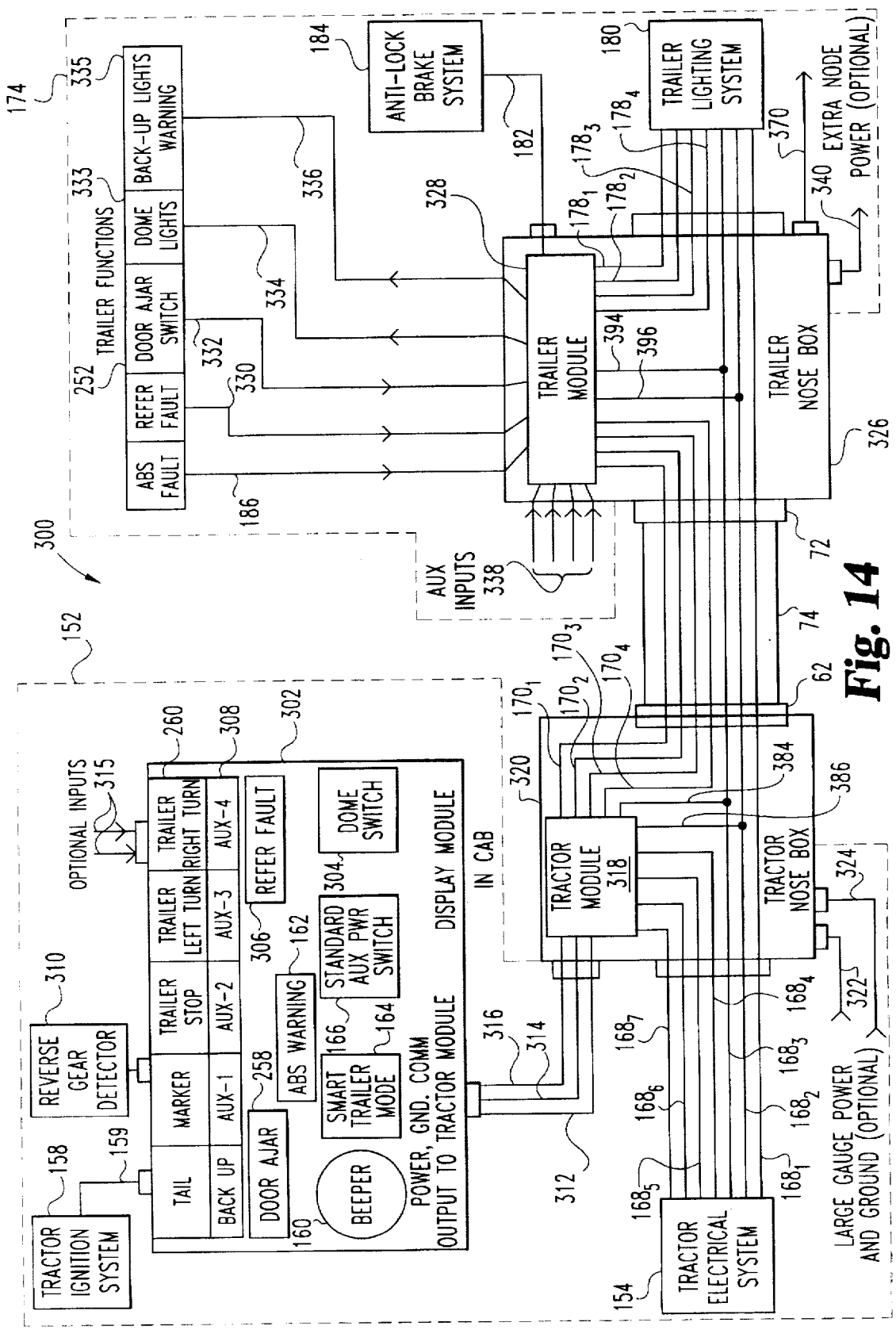
FIG. 14 is a diagrammatical illustration of an electrical power and communications link between a tractor and trailer in accordance with yet another embodiment of the present invention.
Figure 16:
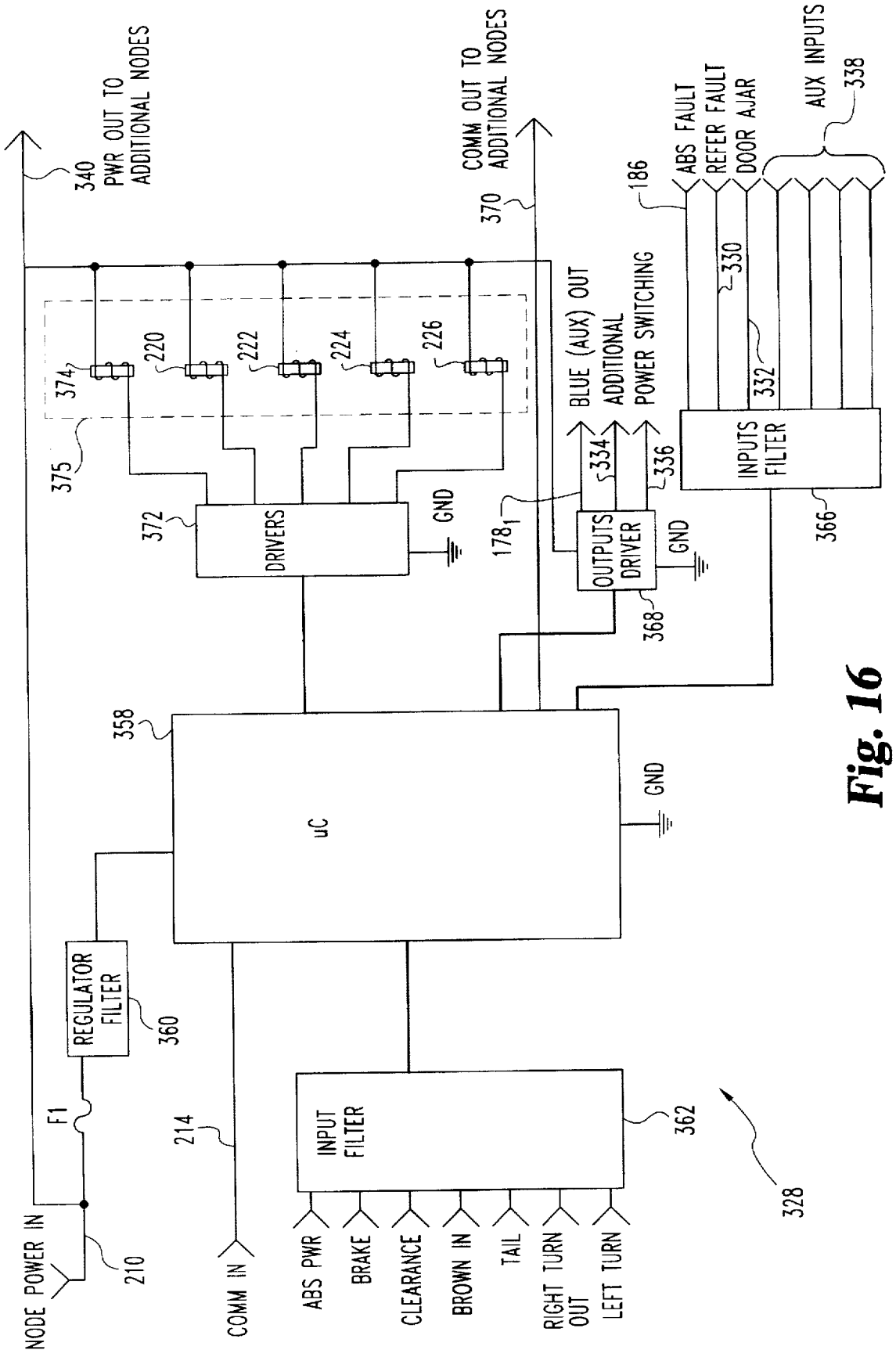
FIG. 16 is a diagrammatical embodiment of of one embodiment of the trailer module of FIG. 14.

Referring now to FIG. 16, one embodiment of trailer control module 328, in accordance with the present invention, is shown. As with the trailer control module embodiments discussed previously, module 328 includes a micro-controller 358 connected to an electrical node power line 210 through fuse F1 and regulator filter 360. Electrical node power line 210 may further be provided as optional node electrical power line 340 (FIG. 14). The communication line COMM 214 is connected to micro-controller 358 as before, and an input filter 362 has the same inputs thereto as described with respect to the input filter 264 of FIG. 12.

A communication line COMM OUT 370 is also provided to establish a communication link with one or more electrical systems forming a part of trailer 174. Micro-controller 358 also has known output driver circuitry 368 connected thereto, which circuitry 368 provides electrical line $178_1$ (Blue (Aux) Out) as described previously, and additional power switching lines 334 and 336 for routing power to, for example, the dome lights 333 and back up lights 336 respectively. An input filter 366 receives the ABS fault, Refer fault and door ajar signal lines 186, 330 and 332 respectively, as well as auxiliary inputs 338, and provides such signals to micro-controller 358. Finally, as with the trailer control module embodiments discussed previously, a driver circuit 372 is connected to an output bus of micro-controller 358, and driver circuit 372 is operable to drive a number of switching devices forming a trailer switching circuit 375, where the switching devices are preferably relays, although may be other switching devices. In the present embodiment, five such relays 374, along with previously discussed relays 220, 222, 224 and 226, are connected to driver circuitry 372.

Figure 17:
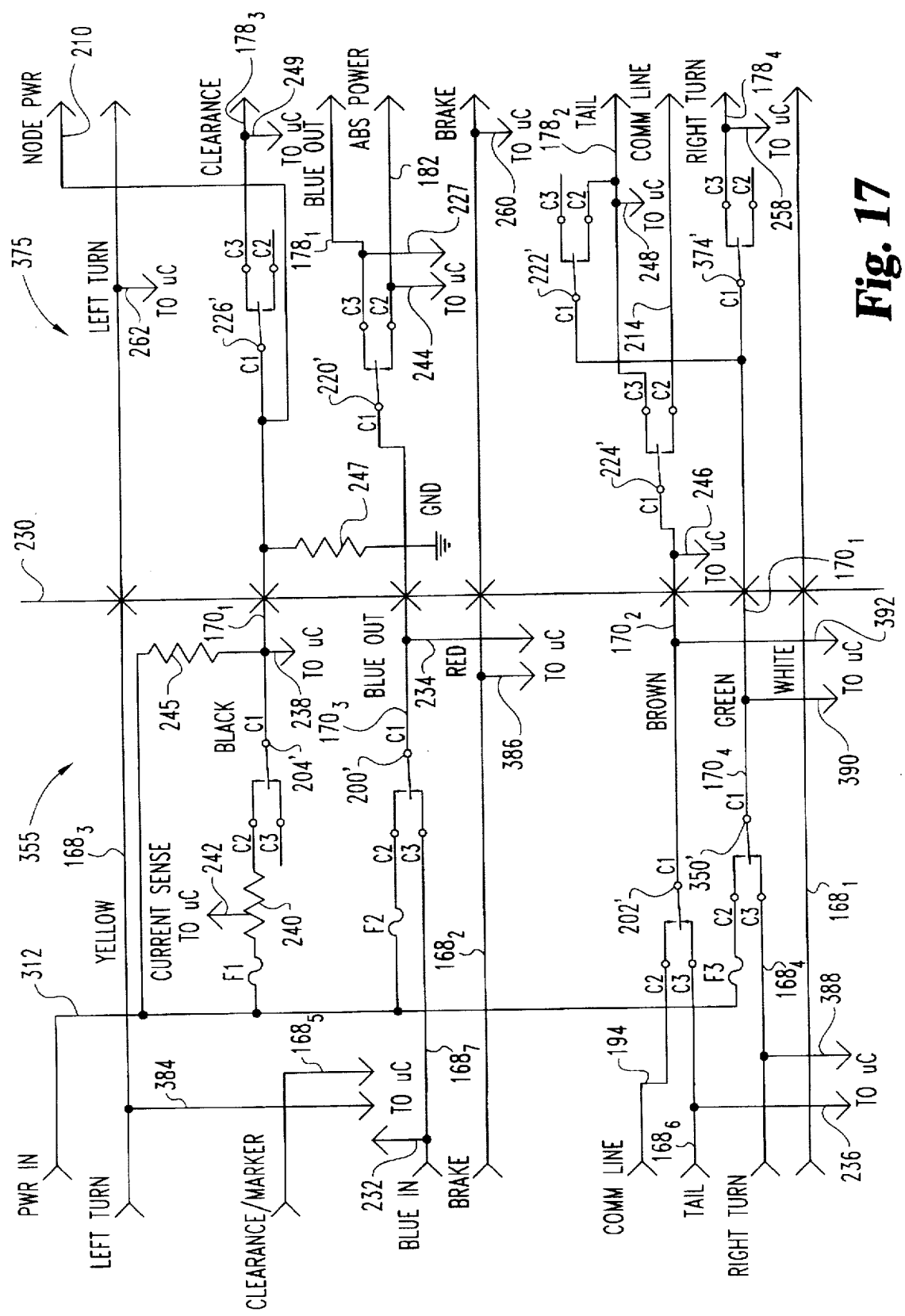
FIG. 17 is an electrical schematic of the electrical power and communication switching circuitry controlled by the tractor and trailer modules of FIGS. 15 and 16.

Referring now to FIG. 17, tractor switching circuit 355 is shown connected to trailer switching circuit 375 via connection 230. Tractor switching circuit 355 is identical in most respects to tractor switching circuit of FIGS. 10 and 13, and like numbers are therefore used to identify like components. Tractor switching circuit 355 includes the following elements in addition to those described with respect to tractor switching circuit 205 of FIGS. 10 and 13. First, switch 350', controlled by relay 350, has a first input connected through fuse F3 to ignition electrical power line 312 and a second input connected to electrical line $168_4$ corresponding to the green RIGHT TURN electrical line of tractor electrical system 154. The output of switch 350' is provided as electrical line $170_4$. Second, a number of status lines have been added to the various electrical lines. For example, status line 384 is connected to electrical line $168_3$, and provides the LEFT TURN input to input filter 346, status line 386 is connected to electrical line $168_2$, and provides the BRAKE input to input filter 346, status line 392 is connected to electrical line $170_2$, and provides the BROWN OUT input to input filter 346, status line 388 is connected to electrical line $168_4$, and provides the RIGHT TURN input to input filter 346, and status line 390 is connected to electrical line $170_4$, and provides the GREEN OUT input to input filter 346.

Trailer switching circuit 375 is identical in most respects to trailer switching circuit 229 of FIG. 13, and like numbers are therefore used to identify like elements. The following are the differences between trailer switching circuit 229 and trailer switching circuit 375. First the input of switch 222' is connected to electrical line $170_4$, rather than to the node power line 210 as in circuit 229. Second, an additional switch, 374', is provided and is controlled by relay 374. The input of switch 374' is connected to electrical line $170_4$, a first output thereof is a non-connection (open), and a second output thereof is connected to electrical line $178_4$.

Operationally speaking, electrical power and communications link 250 is substantially identical to that previously described with respect to link 150. In addition to the previously described operation, however, micro-controller 318 is further operational to control switch 350' from its default position, shown in FIG. 17 as connecting electrical line $168_4$ to electrical line $170_4$, to connect the ignition electrical power line 312 to electrical line $170_4$, thereby providing electrical power to electrical line $170_4$. Micro-controller 328, in addition to the previously described operation, is operable to control switch 374' from its default position, shown in FIG. 17 as connecting electrical line $170_4$ to electrical line $178_4$, to connect electrical line $170_4$ to electrical line $178_4$. Micro-controller 318 is further operable during execution of the communication software algorithm to monitor status lines 384, 386, 388, 390 and 392. One use of such monitoring is to compare tractor electrical lines to corresponding trailer electrical lines and actuate beeper 160 when unexpected differences occur.

In addition to the foregoing operational differences, tractor display module 302 is further operable during execution of the communication software algorithm to monitor the reverse gear detector 310 and provide a communication signal, via the communication line 316, to tractor micro-controller 342, and illuminate "Back Up" indicator of display bar 308, in response to a reverse gear event. Micro-controller 342 is further operable to provide a communication signal, via COMM line 194, to trailer micro-controller 358 of the reverse gear event. Micro-controller 358 is operable to receive the communication signal, via COMM line 214, and provide a control signal to output driver circuit 368 to thereby route power to to back up lights 335 of trailer 174 via electrical line 336. Tractor display module 302 is further operable during execution of the communication software algorithm to monitor a trailer dome light switch (not shown, but can be provided as an input to display module 302 via one of the optional inputs 315) and provide a communication signal, via the communication line 316, to tractor micro-controller 342, and illuminate "Dome Switch" display 304, in response to detection of a trailer dome light request. Micro-controller 342 is further operable to provide a communication signal, via COMM line 194, to trailer micro-controller 358 of the trailer dome light request. Micro-controller 358 is operable to receive the communication signal, via COMM line 214, and provide a control signal to output driver circuit 368 to thereby route power to to dome lights 333 of trailer 174 via electrical line 334. In a similar fashion, and as further described elsewhere herein, any of auxiliary inputs 338 may also be monitored by trailer micro-controller 358, and such input information may be provided either to tractor micro-controller 342, via COMM line 214, for action thereupon, or to another trailer control module via communication line 370. Trailer control micro-controller 358 is further operable to monitor communication line 370 and provide for communications between micro-controller 358 and one or more electrical system forming a part of trailer 174.

Figure 18:
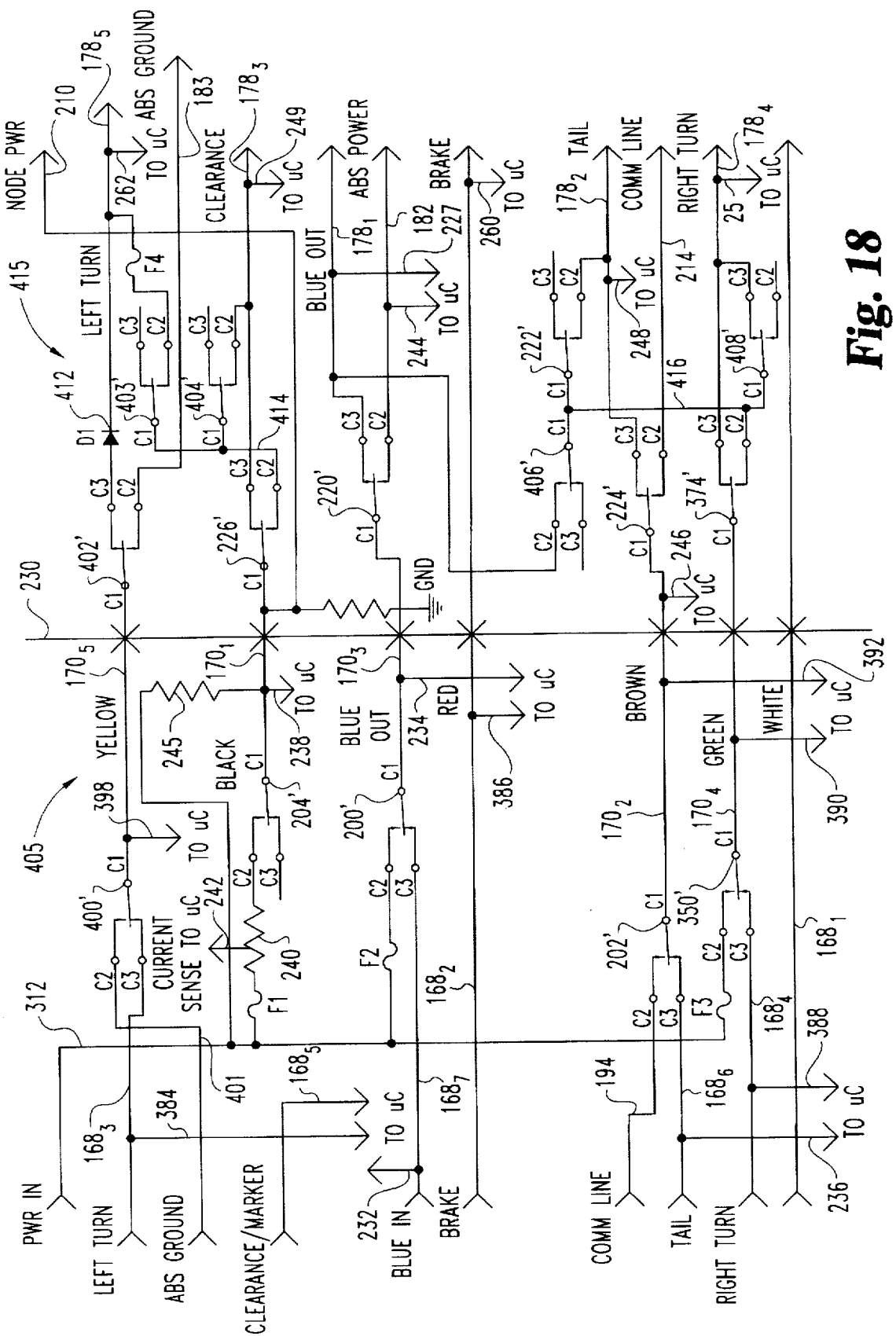
FIG. 18 is an electrical schematic of electrical power and communication switching circuitry for providing an electrical power and communications link between a tractor and trailer in accordance with still another embodiment of the present invention.

Referring now to FIG. 18, still another embodiment of a tractor switching circuit 405 and trailer switching circuit 415 is shown, in accordance with the present invention, for providing an electrical power and communications link between a tractor and a trailer. Switching circuits 405 and 415 are substantially similar to switching circuits 355 and 375 of FIG. 17, so that the overview block diagram and details of the corresponding tractor and trailer control modules are omitted for brevity.

Tractor switching circuit 405 is identical in most respects to tractor switching circuit 355 of FIG. 17, and like numbers are therefore used to identify like components. In addition to those switches described with respect to tractor switching circuit 355, switching circuit 405 further includes a switch 400', controllable by a relay forming part of the corresponding tractor control module (not shown), wherein a first input of switch 400' is connected to electrical line $168_3$ and a second input thereof is connected to a ground line 401. The output of switch 400' is connected to electrical line $170_5$. Trailer switching circuit 415 is likewise identical in many respects to trailer switching circuit 375 of FIG. 17, and like numbers are therefore used to identify like elements.

The following are the differences between trailer switching circuit 375 and trailer switching circuit 415. First the input of switch 222' is connected to a first output of switch 408', rather than to electrical line $170_4$ as in circuit 375. Second, an additional switch, 402', controlled by an additional relay of the corresponding trailer control module (not shown), is provided, wherein tile input of switch 402' is connected to electrical line 1705. One output of switch 402' is connected to one end of a diode D1 412, the opposite end of which is connected to electrical line $178_5$. The other output of switch 402' is connected to a dedicated ABS ground line 183, which has recently been mandated by NHTSA as required on all trailers manufactured after 1998. The diode D1 412 has been added for safety purposes such as if the ABS ground line 183 is inadvertently switched to positive electrical power. If this occurs, diode D1 412 keeps current from flowing back through switch 402', which could possibly damage relay 402.

A third difference is the addition of several switches to accommodate the provision of a dedicated ABS ground line 183. Specifically, switch 403', controllable by a relay forming a part of the corresponding trailer control module (not shown), has an input connected to an output of switch 226'. A first output of switch 403' is a no-connect (open) and a second output thereof is connected to electrical line $178_5$ through fuse F4. Switch 404', controllable by a relay forming a part of the corresponding trailer control module (not shown), has an input connected to the input of switch 403'. A first output of switch 404' is a no-connect (open) and a second output thereof is connected to electrical line $178_3$. Switch 406', controllable by a relay forming a part of the corresponding trailer control module (not shown), has an input connected to the input of switch 222'. A first output of switch 406' is a no-connect (open) and a second output thereof is connected to electrical line $178_1$. Switch 408', controllable by a relay forming a part of the corresponding trailer control module (not shown), has an input connected to the input of switches 222' and 406', as well as an output of switch 374'. A first output of switch 408' is a no-connect (open) and a second output thereof is connected to electrical line $178_4$.

Operationally speaking, switching circuits 405 and 415 are substantially similar to switching circuits 355 and 375 of FIG. 17. In their default states (no power and/or conventional mode of operation), the various switches are in their positions shown in FIG. 18 so that tractor electrical system 154 and trailer lighting system 180 are connected together as described with respect to FIGS. 8-10. In addition to the previously described operation, however, switch 400' is further operational to connect ground reference to electrical line $170_5$. Similarly, switch 402 is operational to connect the ground reference on electrical line $170_5$ to ABS ground line 183 to thereby provide a dedicated ground line thereto. The remaining new switches 403'-408' are operational in conjunction with the previously described trailer switching circuitry switches to properly route electrical power to the various trailer electrical systems as well as the trailer lighting system 180, and to provide maximum flexibility as well as safety in switching power to the appropriate trailer circuits. In all other respects, operation of switching circuits 405 and 415 is identical to those switching circuits previously described.

Referring now to FIGS. 19A and 19B, one embodiment of an electrical socket housing, or nosebox 440, configured to house either a tractor or trailer control module therein, in accordance with another aspect of the present invention, is shown. Nosebox 440 may represent any one of noseboxes 172, 320 or 326 shown and described herein, and may therefore be configured for attachment to either a tractor 152 or a trailer 174. Nosebox 440 includes a first housing portion 450 adapted to be detachably mounted to a surface such as, for example, an exterior surface of a tractor or trailer (not shown). Preferably, housing 450 defines a number of bores 451 therethrough for receiving a fastener therein, wherein the fastener is attached to the tractor or trailer. It is to be understood, however, that the present invention contemplates utilizing any known means for detachably mounting housing 450 to the tractor or trailer such as, for example, a clamp, a shape-memory component, and certain adhesives.

Housing 450 has an interior surface 452, about which a flange 454 is integrally defined. Flange 454 and interior surface 452 together define an interior portion of housing 450. Interior surface 452 further defines a bore 456 therethrough. Extending from interior surface 452 are a number of posts 458 for receipt within corresponding bores 465 of circuit board 460. One side 462 of circuit board 460 includes an electrical connector 464 attached thereto, which electrical connector 464 is preferably provided with seven terminals arranged in accordance with SAE J-560 standards. It is to be understood, however, that the present invention contemplates providing electrical connector 464 with electrical connections having other than a SAE J-560 configuration. Circuit board 460, electrical connector 464 and housing 450 are configured such that connector 464 is received within bore 456 of housing 450 as posts 458 are received within corresponding bores 465.

An opposite side 466 of circuit board 460 includes a number of conductors extending therefrom. Preferably, seven such conductors $468_1$–$468_7$ are connected to circuitry contained on and/or within circuit board 460 so that conductors $468_1$–$468_7$ may be connected to a suitable SAE J-560 electrical connector. Circuit board 460, as indicated, contains circuitry thereon and/or therein, and preferably, the circuitry comprises at least a portion of a tractor or trailer control module, such as one of the embodiments shown and described herein. For example, circuit board 460 of FIG. 19A is shown having the four relays 220, 222, 224 and 226 of trailer control module 176 (FIG. 9) detachably mounted to side 466 thereof. According to one embodiment of the tractor or trailer control modules of the present invention, circuit board 460 is intended to contain the entirety of the control module therein and/or thereon, such that only the circuit components subject to wear, or that otherwise may require replacement, are accessible and replaceable. Thus, circuit board 460 is preferably configured so that relays 220–226 may be replaced without removing circuit board 460 from within the interior portion of housing 450.

After the circuit board 460 is positioned within the interior portion of housing 450, by passing posts 458 through corresponding bores 465, a liquified molding compound 469 is dispensed into the interior portion of housing 450, which surrounds circuit board 460 and fills the interior portion of housing 450. Preferably, molding compound 469 is a liquified compound operable to fill the interior portion of housing 450 and thereafter cure to at least a semi-rigid state and secure circuit board 460 to the interior surface 452, and to the inner surface of flange 454, of housing 450 with circuit board 460 embedded therein. As such, molding compound 469 is operable to provide a seal for board 460 against environmental contaminants such as moisture, dust, and the like. Molding compound 469 is preferably an epoxy-based resin compound operable to cure at a sufficiently low temperature so that circuit components formed on/within circuit board 460 are not damaged.

A housing cover 472 is further provided and is preferably configured complementarily to housing flange 454 with a recessed portion 474 configured to receive flange 454 therein. Housing 450 further includes a pair of posts 476 extending outwardly, and in opposite directions, from flange 454, and housing cover 472 defines a pair of bores 478 therethrough to the recessed portion 474. Bores 478 are configured to receive posts 476 therein to thereby pivotably mount cover 472 to housing 450.

Housing cover 472 has an electrical connector 470 mounted thereto, which connector 470 includes a number of terminals 471 defined therein. Each of terminals 471 are connected to a corresponding conductor $468_1$–$468_7$, and preferably terminals 471 of connector 470 are arranged in SAE J-560 configuration. It is to be understood, however, that electrical connectors 470 and 464 need not be provided in accordance with SAE J-560 standards, and that the structural concepts of nosebox 440 apply regardless of the respective configurations of connectors 464 and 470, and further regardless of the number of electrical connection terminals associated therewith.

Flange 454 of housing 450 preferably includes a flexible member 480 mounted to flange 454 to provide sealing engagement between flange 454 and recess 474 of housing cover 472. Housing cover 472 further includes a pair of bores 484 therethrough and arranged to be in alignment with a corresponding bore 486 formed through flange 454. It is intended that housing cover 472 should be pivotable about posts 476 such that flange 454 is received within recess 474 of housing cover 472, so that flexible seal 480 may provide an environmentally sealing engagement between flange 454 and recess 474. A pin, or other fastening member 482 is passed through bores 484 to thereby lock housing cover 472 into sealing engagement with housing 450 and to prevent tampering of the contents of housing 450. Preferably, pin 482 has a head 483 at one end thereof and defines a bore 486 therethrough at an opposite end thereof. A locking element 485 is further provided which extends into bore 486 after passing pin 482 through bores 484. Locking element 485 may be a suitable pin configuration as shown in FIG. 119A, or may be a more elaborate locking element such as a padlock, for example.

An electrical connector plate 490 is further included and defines a number of bores 494,498 and 502 therethrough. A corresponding flange portion 488 of housing cover 472 also defines a number of bores 496 and 502 therethrough such that a pin, or other fastening member 492, can be passed through bores 494, 496, 498, 500 and 502 to thereby pivotably attach plate 490 to housing cover 472 so as to protect electrical connector 470 from the environment. Although not shown in detail in the drawings, the pivotable attachment between plate 490 and housing cover 472 is preferably such that plate 490 is biased in its downward position as shown in order to protect electrical connector 470 when not in use.

The foregoing structure of nosebox 440 is advantageous in several respects. First, it provides a convenient location for the tractor or trailer control module, which location is preferably protected from the environment. Secondly, the pivotable mounting of housing cover 472 to housing 450 permits certain components mounted to circuit board 460 to be easily accessed and replaced. Thirdly, the pivotable mounting of housing cover 472 to housing 450, as well as the connections provided between conductors 468₁–468₇ and the corresponding terminals 471 of connector 470, permits any and/or all of the terminals 471 to be easily replaced when necessary due to wear, breakage and/or corrosion.

Figure 20A:
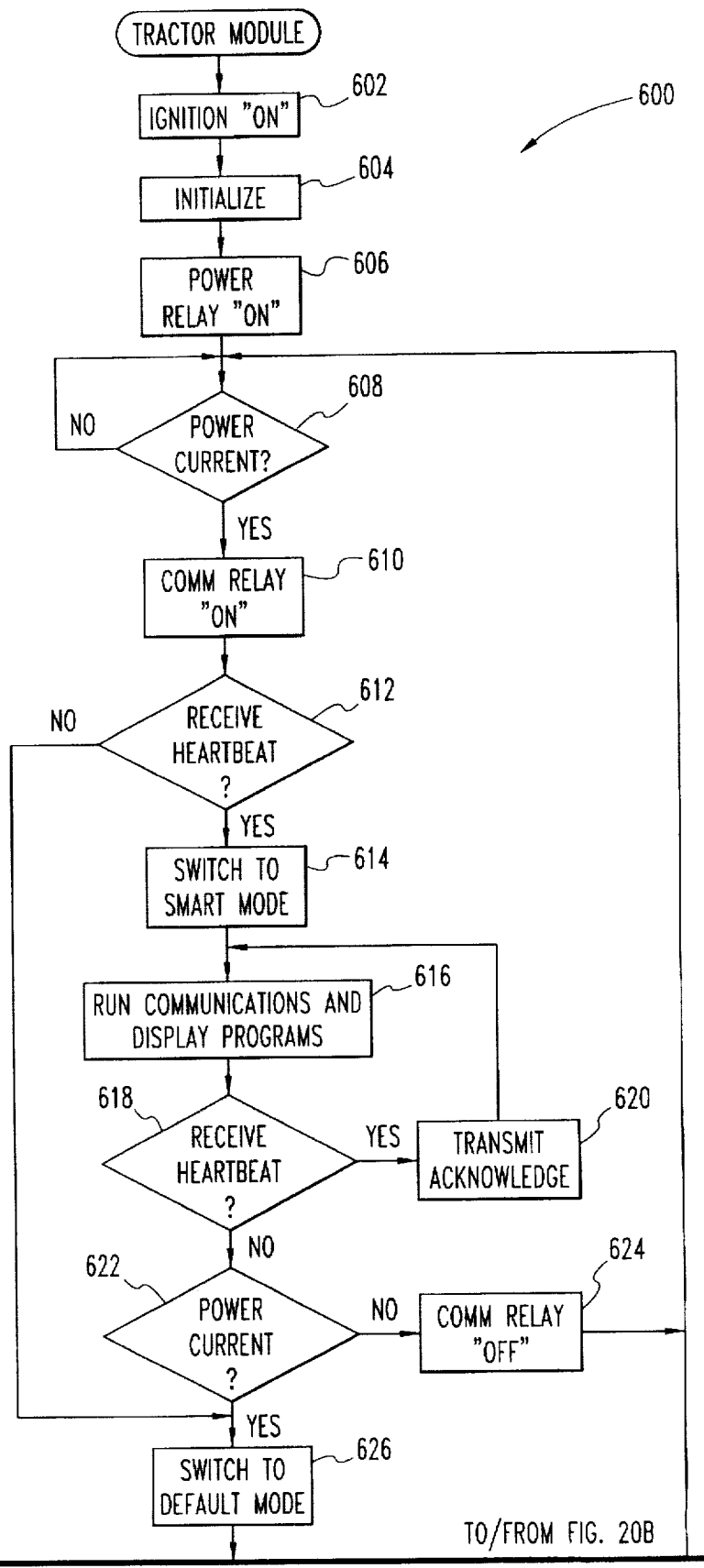
FIG. 20 is composed of FIGS. 20A and 20B and illustrates a flow chart depicting one embodiment of a software algorithm, in accordance with another aspect of the present invention, which is executable by any of the tractor modules described herein to establish smart or conventional mode of operation.
Figure 20B:
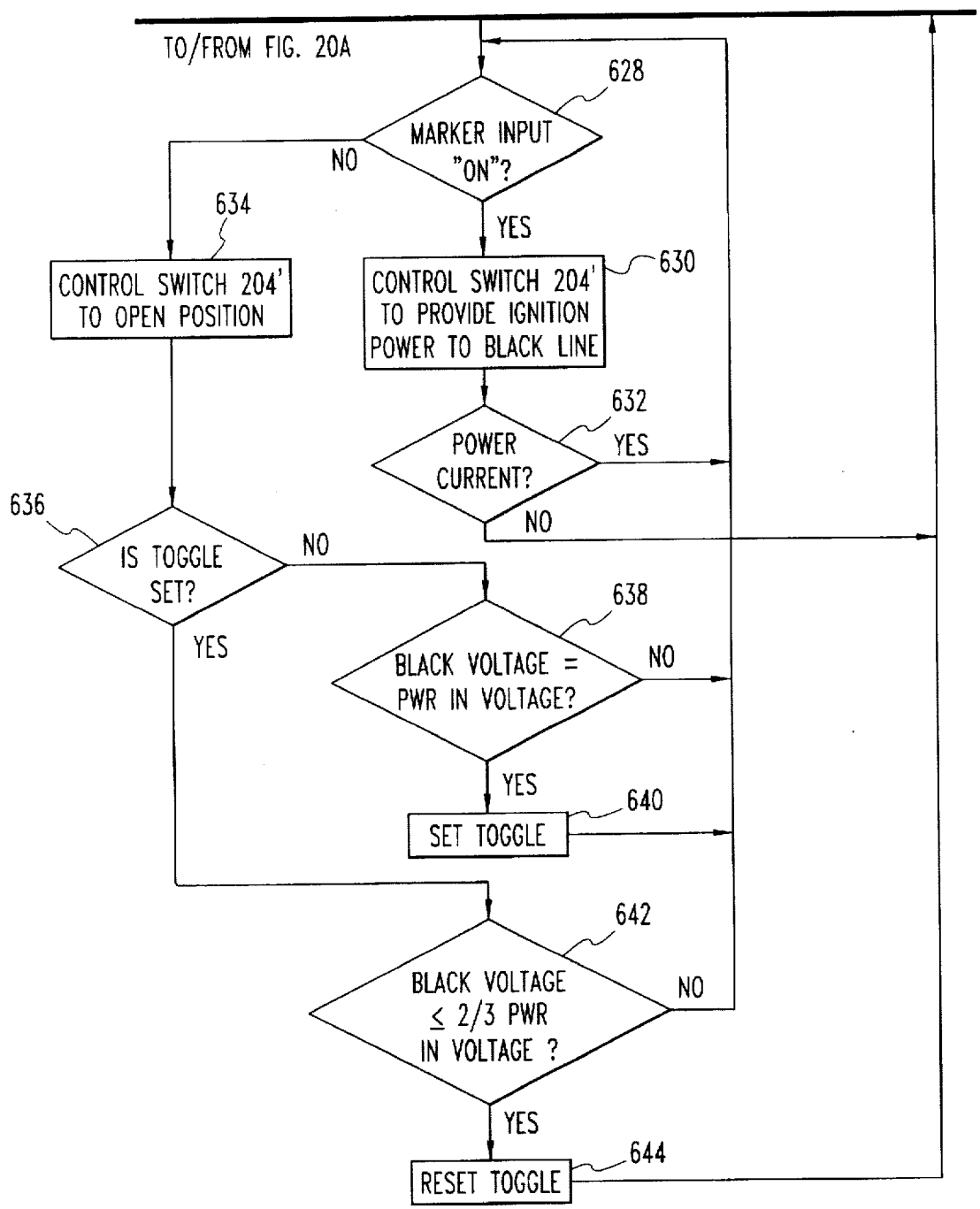

Referring now to FIG. 20, which is composed of FIGS. 20A and 20B, a flow chart depicting one embodiment of a software algorithm 600, in accordance with yet another aspect of the present invention, is shown. Algorithm 600 is executable by any of the tractor control modules described herein to establish smart or conventional mode of operation with a trailer connected thereto. In the following description of algorithm 600, the algorithm will be described with respect the electrical power and communications link 150 of FIGS. 7–10, although it should be understood that algorithm 600 operation is identical with respect to any of the tractor control module embodiments discussed herein.

Referring specifically to FIG. 20A, algorithm 600 begins at step 602 with an ignition "on" event. The ignition "on" event typically corresponds to starting of the tractor engine by a tractor operator so that ignition voltage is provided by the tractor ignition system 158 to the tractor control module via ignition electrical power line 159. Thereafter at step 604, micro-controller 190 of tractor control module 156 executes an initialization routine wherein micro-controller 190 typically sets initial micro-controller parameters, tests display communications, and sets all displays 160–166 to default values.

Thereafter at step 606, the tractor control module 156 controls relay 204 to route electrical power from the tractor ignition power line 159 to the electrical line corresponding to the node electrical power line 210 of the trailer control module 176 in a manner as described hereinabove. Program execution continues at step 608 where the current flowing through resistor 240 (through switch 204') is sensed and provided to the input of A/D converter 195, which provides a digital signal representation thereof to micro-controller 190. If micro-controller 190 determines from the digital current signal that the current flowing through switch 204' and through resistor 240 is a current associated with the ignition electrical power line 159, then algorithm execution continues at step 610. If, however, micro-controller 190 determines from the digital current signal that the current flowing through switch 204' and through resistor 240 is not a current associated with the ignition electrical power line 159, then the algorithm loops back to step 608. The algorithm thus operates in a continuous loop until micro-controller 190 senses that trailer control module 176 has been properly connected to tractor control module 156 so that an expected quantity of current flows through resistor 240 and switch 204'.

Algorithm execution continues at step 610 where the tractor control module controls relay 202 to connect the tractor communication line (COMM 194) to the electrical line corresponding to the trailer control module communication line (COMM 214). Thereafter at step 612, micro-controller 190 monitors COMM 194 to determine whether a "heartbeat" signal has been received from a trailer module within a predetermined time period after executing step 610, which predetermined time period is preferably in the range of 1–100 milliseconds. If no "heartbeat" signal is received within the predetermined time period after connecting COMM 194 to COMM 214, algorithm execution continues at step 626 where micro-controller 190 controls switches 202'–204' to their default states, as shown in FIG. 10, to thereby configure electrical lines 168₁–168₄ and 170₁–170₃ for conventional trailer operation (trailer lighting system 180 only). If, at step 612, a "heartbeat" signal is received on COMM 194 within the predetermined time period after executing step 610, micro-controller 190 switches operation to "Smart Mode" operation at step 614.

Execution of the "Smart Mode" step 614 includes several substeps. First, micro-controller 190 controls the remainder of the switching devices (relays) to switch from conventional mode of operation to its opposite state. In the switching circuit 205 of FIG. 10, this step entails controlling switch 200' to connect the ignition electrical power line 159 to electrical line 170₃ to thereby route electrical power to the ABS 184 of trailer 174. Second, micro-controller 190 sends a control signal to drive circuitry 206, thereby illuminating the "Smart Trailer Mode" display 164 of trailer control module 156. Thereafter, at step 616, micro-controller 190 executes a communications and display routine, described more fully hereinabove, wherein micro-controller 190 monitors COMM 194 as well as the inputs provided by input filter 196, and displays appropriate information on one or more of displays 160–166 and/or sends appropriate information to the trailer control module 176 via COMM 194.

Algorithm execution continues from step 616 to step 618 where COMM line 194 is again monitored to determine whether a "heartbeat" signal has been detected thereon within a predetermined time period since detecting the last "heartbeat" signal, which predetermined time period is preferably within the range of 1–100 milliseconds. If, at step 618, micro-controller 190 determines that a "heartbeat" signal has been detected within a predetermined time period since detecting the last "heartbeat" signal, then algorithm execution continues at step 620 where micro-controller 190 transmits an "acknowledge" signal on COMM line 194, after which algorithm execution continues at step 616. If, at step 618, micro-controller 190 determines that a "heartbeat" signal has not been detected within a predetermined time period since detecting the last "heartbeat" signal, then algorithm execution continues at step 622 where the current through resistor 240 and switch 204' is tested to determine whether ignition electrical power current is flowing therethrough. If not, algorithm execution continues at step 624 where the tractor control module controls relay 202 to disconnect the tractor communication line (COMM 194) from the electrical line corresponding to the trailer control module communication line (COMM 214). Program execution continues from step 624 to step 608. If ignition electrical power current is flowing through resistor 240 at step 622, then algorithm execution continues at step 626 where micro-controller 190 controls switches 202'–204' to their default states, as shown in FIG. 10, to thereby configure electrical lines 168₁–168₄ and 170₁–170₃ for conventional trailer operation (trailer lighting system 180 only). Program execution continues from step 626 to step 628.

Referring now to FIG. 20B, program execution continues from step 626 at step 628 where the clearance/marker status line 168₅ is monitored. If, at step 628, clearance/marker lamp operation has been requested from within the tractor 152, tractor control module 156 controls relay 204, at step 630, to route electrical power from the tractor ignition power line 159 to the electrical line corresponding to the node electrical power line 210 of the trailer control module 176 in a manner as described hereinabove. Thereafter at step 632, the current through switch 204' (through resistor 240, specifically) is monitored. If, at step 632, tractor ignition power current is flowing through resistor 240, algorithm execution continues at step 628. If, at step 632, tractor ignition power current is not flowing through resistor 240, algorithm execution continues at step 608. If, at step 628, clearance/marker operation has not been requested, tractor control module 156 controls relay 204, at step 634, to disconnect tractor ignition power line 159 from electrical line $170_1$.

Program execution continues from step 634 at step 636 where the status of a "flag" is tested. If the flag is detected as set at step 636, algorithm execution continues at step 642. If, at step 636, the flag is detected as not set, algorithm execution execution continues at step 638 where the voltage at electrical line $170_1$ is tested. If, at step 638, the voltage at electrical line $170_1$ is equal to the tractor ignition voltage, the flag is set at step 640 and algorithm execution continues therefrom at step 628. If, at step 638, the voltage at electrical line $170_1$ is not equal to the tractor ignition voltage, algorithm execution continues at step 628.

If, at step 636, the flag is set, algorithm execution continues at step 642 where the voltage at electrical line $170_1$ is tested. If, at step 642, the voltage at electrical line $170_1$ is greater than ⅔ of the tractor ignition voltage, algorithm execution continues at step 628. If, at step 642, the voltage at electrical line $170_1$ is less than or equal to ⅔ of the tractor ignition voltage, the flag is reset at step 644, and algorithm execution continues therefrom at step 608.

If, in accordance with the portion of algorithm 600 set forth in FIG. 20A, a periodic heartbeat signal is not detected within an expected time period, the tractor micro-controller tests the tractor ignition power current to determine whether the trailer control module 176 has been disconnected from the tractor control module 156. If so, then the algorithm loops continuously until micro-controller 190 detects a reconnection. If the trailer control module 176 has not been disconnected from the tractor control module 156 but no heartbeat signal is detected, this indicates loss of communication between the tractor and trailer control modules 156 and 176 respectively, and the tractor control module 156 responds by switching back to the conventional mode of operation. In so doing, micro-controller 190 resets displays 160–166 and controls switching devices 200'–204', to their default states.

The portion of algorithm 600 set forth in FIG. 20B is intended to address instances wherein a conventional trailer is disconnected from a "smart" tractor, and a "smart" trailer connected thereto, with no interruption in tractor ignition power. Such instances are commonplace and occur when a tractor operator switches trailers without turning off the tractor ignition.

With the tractor's ignition activated and a conventional trailer connected to the tractor control module 156 so that tractor control module 156 is operating in the conventional mode (switches 200'–204' in their default positions as shown in FIG. 10), various electrical conditions can occur, depending on the physical properties of the trailer, when disconnecting the conventional trailer. For example, if the conventional trailer has incandescent clearance/marker lamps associated therewith, and those lamps are not activated when the conventional trailer is disconnected, the voltage at electrical line $170_1$ will transition from approximately zero volts (incandescent lamps act as a short to ground under low current conditions, as is known in the art) to the tractor ignition voltage. When a trailer is reconnected to the tractor, the voltage at electrical line $170_1$ will transition below at least ⅔ of the tractor ignition voltage. If the reconnected trailer is one having incandescent clearance/marker lamps, the voltage at electrical line $170_1$ will be at approximately zero volts as previously described. If, however, the reconnected trailer is a "smart" trailer, then the voltage at electrical line $170_1$ will be the voltage across resistor 247 of trailer switching circuit 225. Since resistor 245 is approximately 20 kohms and resistor 247 is approximately 10 kohms, the voltage at electrical line $170_1$ will be approximately ⅓ of the tractor ignition voltage. Those skilled in the art will recognize that other ratios of resistor 245 to resistor 247 can be used without detracting from the concepts of the present invention. In either case, the tractor control module thereafter executes the portion of algorithm 600 which determines whether the reconnected trailer is a conventional trailer or a smart trailer, and controls relays 200–204 accordingly.

If the reconnected trailer is a conventional trailer having LED clearance/marker lamps associated therewith, the voltage at electrical line $170_1$ will not transition to a value less than or equal to approximately ⅔ of the tractor ignition voltage, but will rather remain at the tractor ignition voltage since the lamps are not activated. Similarly, if the conventional trailer disconnected from the tractor is one having LED clearance/marker lamps which are not activated when the trailer is disconnected, the voltage at electrical line $170_1$ will remain at the tractor ignition voltage when the trailer is disconnected from the tractor. In such a case, the flag is set. Thereafter, the tractor control module will not execute the portion of algorithm 600 which determines whether the reconnected trailer is a conventional trailer or a smart trailer until the voltage at electrical line $170_1$ transitions below at least ⅔ of the tractor ignition voltage and the flag is reset, in which case the reconnected trailer is either a smart trailer or a conventional trailer having incandescent clearance/marker lamps. If, on the other hand, the reconnected trailer is a conventional trailer having LED clearance/marker lamps, the tractor control module will simply continue operation in the conventional mode.

If any type of trailer is disconnected from a smart tractor with the clearance/marker lamp activated, regardless of the type of lamp, the current flow through electrical line $170_1$ will be interrupted, as detected by monitoring resistor 245, when the trailer is disconnected. The tractor module, in this case, will wait until a trailer is reconnected to the tractor by again monitoring the current through resistor 245 and, once reconnected, will attempt to establish communications with the trailer as previously described.

Figure 21:
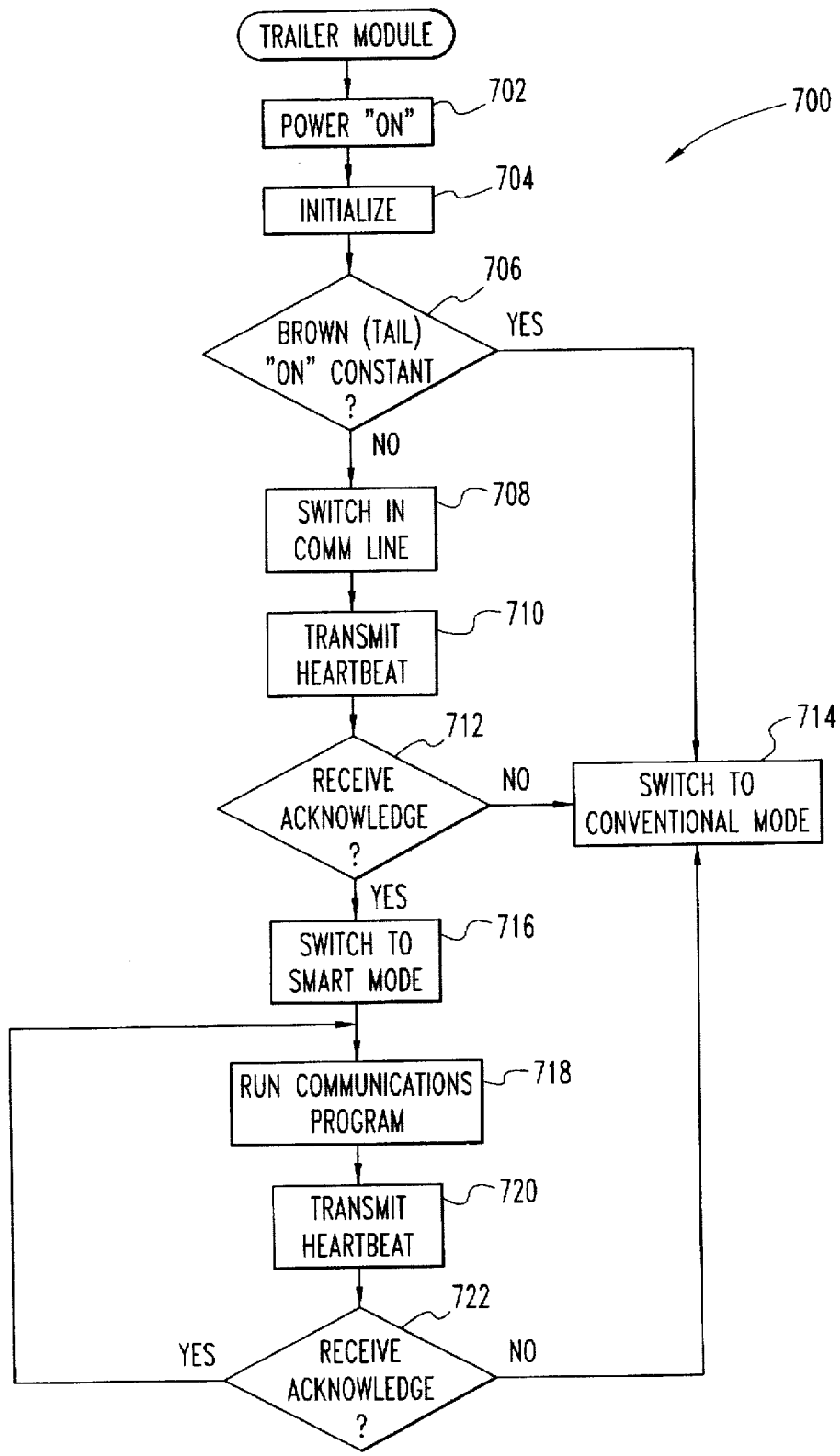
FIG. 21 is a flow chart depicting one embodiment of a software algorithm, in accordance with yet another aspect of the present invention, which is executable by any of the trailer modules described herein to establish smart or conventional mode of operation.

Referring now to FIG. 21, a flow chart depicting one embodiment of a software algorithm 700, in accordance with still another aspect of the present invention, is shown. Algorithm 700 is executable by any of the trailer control modules described herein to establish smart or conventional mode of operation with a tractor connected thereto. In the following description of algorithm 700, the algorithm will be described with respect the electrical power and communications link 150 of FIGS. 7–10, although it should be understood that algorithm 700 operation is identical with respect to any of the trailer control module embodiments discussed herein.

Algorithm 700 begins at step 702 with an power "on" event. The power "on" event typically corresponds to a supply of ignition electrical power by tractor control module 156 to the node electrical power line 210 of trailer control module 176. This power "on" step acts to "wake up" the trailer control module 176, and thereafter at step 604, micro-controller 208 of trailer control module 176 executes an initialization routine wherein micro-controller 208 typically sets initial micro-controller parameters and insures correct default setting for switching devices 220'–226'.

Thereafter at step 706, micro-controller 208 tests the voltage level on electrical line $178_2$, corresponding to the trailer Tail lamp circuit. If a constant voltage is detected on electrical line 178$_2$, this indicates that COMM line 194 is either not properly connected thereto or that micro-controller 190 is not properly communicating via COMM line 194. In either case, algorithm execution continues from step 706 to step 714 where the trailer control module 176 switches to the conventional mode of operation. At this point in the algorithm, no switching devices have been switched from their default positions, so that step 714 merely causes micro-controller 208 to forego monitoring of any inputs provided by input filter 216, as well as ally ABS fault information occurring on signal line 186. If, at step 706, a non-constant voltage is detected on electrical line 178$_2$, this indicates that COMM line 194 is connected thereto and operating properly, in which case algorithm execution continues at step 708.

At step 708, micro-controller controls switch 224' to connect electrical line 170$_2$ to COMM line 214, thereby connecting COMM line 194 of tractor control module 156 to COMM line 214 of trailer control module 176 to establish a single communication line therebetween. Thereafter at step 710, micro-controller 208 transmits a heartbeat signal on COMM line 214.

Algorithm execution continues from step 710 at step 712 where micro-controller 208 monitors COMM line 214 to determine whether an "acknowledge" signal has occurred thereon within a predetermined time period after transmitting the heartbeat signal, which predetermined time period is preferably within the range of 1–100 milliseconds. If, within a predetermined time period after transmitting the heartbeat signal no acknowledge signal has been detected on the COMM line 214, algorithm execution continues at step 714. If, at step 712, an acknowledge signal has been detected within a predetermined time period after transmitting the heartbeat signal on the COMM line 214, algorithm execution continues at step 716 where trailer control module 176 switches to the Smart Mode of operation.

Switching to the Smart Mode of operation at step 716 causes micro-controller 208 to control switching device 220' to connect electrical line 170$_3$ to ABS power line 182, thereby routing a dedicated ignition electrical power line to a power supply input of ABS 184. From step 716, algorithm execution continues at step 718 where micro-controller 208 runs a communication algorithm, the details of which are set forth in greater detail hereinabove. Essentially, the communications algorithm causes micro-controller 208 to monitor inputs provided to input filter 216, the ABS fault line and the COMM line 214 for communication from tractor control module 156, and respond thereto accordingly. For example, if tractor control module transmits a communication that tail lamp operation is desired, micro-controller 208 controls switch 222' to connect node electrical power 210 to electrical line 178$_2$, thereby providing electrical power to the Tail lamp circuit of the trailer 174. Other such communications algorithm operation by trailer control module 176 is set forth in greater detail above.

Algorithm execution continues from step 718 to step 720 where micro-controller 208 transmits another heartbeat signal, preferably within a predetermined time period after transmitting the previous heartbeat signal, which predetermined time period is preferably within the range of 1–100 milliseconds.

Thereafter at step 722, micro-controller monitors the COMM line 214 to determine whether an acknowledge signal has been detected thereon within a predetermined time period after transmitting the heartbeat signal at step 720. If the acknowledge signal has been detected on the COMM line 214 within the predetermined time period since transmitting the heartbeat signal at step 720, algorithm execution continues at step 718. If, at step 722, the acknowledge signal has not been detected on the COMM line 214 within the predetermined time period since transmitting the heartbeat signal at step 720, algorithm execution continues at step 714 where micro-controller 208 controls each of switching devices 220'–226' to its default position, and further disregards any data provided thereto by input filter 216, ABS fault line 186, as well as any data detected on the COMM line 214. Hereafter, the only way to reenter the Smart Mode of operation is to restart algorithm 700 by either reinitiating the ignition sequence, or by disconnecting umbilical cord 74 from electrical connector 72 and then reconnecting cord 74 thereto.

Thus, the trailer control module 176 is operable to monitor the COMM line 214 and periodically transmit heartbeat signals thereon. If similarly periodic acknowledge signals are detected as being sent by trailer control module 156, then the Smart Mode of operation will continue. If, however, the trailer control module 176 fails to detect an expected acknowledge signal, then trailer control module switches back to the conventional mode of operation.

It should be pointed out that each of the electrical power and communication link embodiments shown and described herein utilizes a sufficiently slow serial data communications rate that a single communications line is needed and no electrical noise reduction techniques need be employed. Such communication software is known and commercially available through Transportation Safety Devices, Inc. of Indianapolis, Indiana.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tractor communication and power switching system for establishing a power and communications link with a trailer, comprising:

a plurality of switching devices each having an input switchable between an electrical line forming part of an electrical system of the tractor and one of an electrical power line connected to a source of power associated with the tractor and a single unpowered communication line, and an output connected to the trailer; and a tractor control module having an input/output connected to said single unpowered communication line for sending and receiving communication signals thereon, said tractor control module controlling said plurality of switching devices to connect the inputs of first and second ones of said switching devices to said communication line and said electrical power line respectively.

2. The system of claim 1 wherein an input of at least one of said switching devices is switchable between a tractor electrical system electrical line and a ground line;

and wherein said tractor control module further controls said plurality of switching devices to connect the input of a third one of said switching devices to said ground line.

3. The system of claim 1 wherein said tractor control module further controls said plurality of switching devices to connect the input of a third one of said switching devices to said electrical power line.

4. The system of claim 3 wherein said tractor control module includes a current sense input coupled to the output of said third switching device to monitor current flow therethrough.

5. The system of claim 4 further including an A/D converter having an analog input connected to the output of said third switching device and a digital output connected to said current sense input, said A/D converter monitoring current flowing through said third switching device and providing a digital current signal at said digital output representative thereof.

6. The system of claim 3 wherein at least one of said switching device inputs is switchable between tractor electrical system electrical line and a ground line;

and wherein said tractor control module further controls said plurality of switching devices to connect the input of a fourth one of said switching devices to said ground line.

7. The system of claim 6 wherein said tractor control module further controls said plurality of switching devices to connect the input of a fifth one of said switching devices to said electrical power line.

8. The system of claim 1 further including a display module associated with the tractor;

wherein said tractor control module is operable to receive diagnostic data relating to the trailer via said communication line and display said diagnostic data with said display module.

9. The system of claim 1 wherein said tractor control module further includes a plurality of status inputs each coupled to a corresponding one of said switching device outputs, said tractor control module determining a status of each of said switching devices by monitoring a signal level at the output thereof.

10. The system of claim 1 further including an electrical connector housing attached to the tractor, said housing having an electrical connector attached thereto, said electrical connector defining a number of electrical terminals, at least some of said electrical terminals connected to outputs of some of said plurality of switching devices and others of said electrical terminals connected to electrical lines of a at least a portion of the tractor electrical system, said housing defining an interior thereof and having the tractor communication and power switching system attached to said housing interior.

11. The system of claim 10 wherein said connector is a J-560 connector.

12. The system of claim 10 wherein the tractor communication and power switching system is attached to said housing interior by a potting compound.

13. A method of operating an electronic tractor control module to provide a dedicated electrical power line from a tractor electrical system to a trailer, the method comprising the steps of:

controlling a first switching device, associated with the tractor control module and having an output connected to the trailer, to establish a single unpowered communication line therethrough from the tractor control module to the trailer by disconnecting a first electrical line of a trailer electrical system from an input thereof and connecting a communication port of the tractor control module thereto;

monitoring the single unpowered communication line for a heartbeat signal;

controlling a second switching device, associated with the tractor control module and having an output connected to the trailer, to provide a dedicated power line from the tractor electrical system to the trailer if the heartbeat signal is detected on the single unpowered communication line within a first predetermined time period after establishing the communication line by disconnecting a second electrical line of the tractor electrical system from an input thereof and connecting an electrical power line of the tractor electrical system thereto; and controlling the first switching device by disconnecting the communication port from the first switching device input and connecting the first tractor electrical system electrical line thereto if the heartbeat signal is not detected on the single unpowered communication line within the first predetermined time period after establishing the communication line.

14. The method of claim 13 further including the step of monitoring the communication line for trailer diagnostic data after providing the dedicated power line from the tractor electrical system to the trailer.

15. The method of claim 13 wherein the method includes operating the tractor control module to further provide a dedicated ground line from the tractor electrical system to the trailer;

and further include the step of controlling a third switching device, associated with the tractor control module and having an output connected to the trailer, to provide a dedicated ground line from the tractor electrical system to the trailer if the heartbeat is detected on the communication line within the first predetermined time period after establishing the communication line by disconnecting a third electrical line of the tractor electrical system from an input thereof and connecting a ground line of the tractor electrical system thereto.

16. The method of claim 13 further including the following step prior to any of the existing steps:

controlling a third switching device, associated with the tractor control module and having an output connected to the trailer, to provide electrical power from the tractor electrical system to a trailer control module by disconnecting a third electrical line of the tractor electrical system from an input thereof and connecting an electrical power line of the tractor electrical system thereto.

17. The method of claim 16 further including the following step directly following the step of controlling the third switching device:

monitoring current through the third switching device and performing the remaining steps only if electrical current from the tractor electrical system flows therethrough.

18. The method of claim 17 further including the following steps directly after the step of controlling the second switching device:

continuously monitoring the communication line for heartbeat signals;

sending an acknowledgment signal on said communication line if a heartbeat signal is detected thereon within a second predetermined time period after receiving a previous heartbeat signal; and if a heartbeat signal is not detected on the communication line within a second predetermined time period after receiving a previous heartbeat signal, performing the following:

monitoring current through the third switching device;

controlling the first, second and third switching devices by disconnecting the communication port and electrical power lines respectively therefrom and reconnecting the first, second and third electrical lines of the tractor electrical system respectively thereto if no electrical current from the tractor electrical system flows through the third switching device.

19. The method of claim 18 wherein the method includes operating the tractor control module to further provide a dedicated ground line from the tractor electrical system to the trailer;

and further including the steps of:
controlling a fourth switching device, associated with the tractor control module and having an output connected to the trailer, to provide a dedicated ground line to the trailer by disconnecting a fourth tractor electrical system electrical line from the fourth switching device input and connecting a ground line of the tractor electrical system thereto; and controlling the fourth switching device by disconnecting the ground line therefrom and reconnecting the fourth electrical line of the tractor electrical system thereto if no electrical current from the tractor electrical system flows through the third switching device.

20. A trailer communication and power switching system for establishing a power and communications link with a tractor, comprising:

a first plurality of switching devices each having an input connected to the tractor and output switchable between an electrical line forming part of a lighting system of the trailer and one of an electrical power line forming part of a trailer electrical system and a single unpowered communication line; and a trailer control module having an input/output connected to said single unpowered communication line for sending and receiving communication signals thereon, said trailer control module controlling said first plurality of switching devices to connect first and second ones of said switching device outputs to said communication line and a first one of said trailer electrical system respectively.

21. The system of claim 20 wherein said trailer control module further controls said first plurality of switching devices to connect the output of a third one of said switching devices to a second one of said trailer electrical system electrical lines.

22. The system of claim 20 wherein said trailer control module includes a power supply input connected to the tractor.

23. The system of claim 20 further including a second plurality of switching devices each having an input connected to a power supply input of the trailer control module and an output switchable between an electrical line forming part of the trailer lighting system and an open position;

and wherein said trailer control module controls said second plurality of switching devices to connect the output of a first one thereof to the corresponding trailer lighting system electrical line to provide electrical power thereto.

24. The system of claim 23 wherein said trailer control module further controls said second plurality of switching devices to connect the output of a second one thereof to the corresponding trailer lighting system electrical line to provide electrical power thereto.

25. The system of claim 23 wherein said trailer control module further controls said third plurality of switching devices to connect the output of a second one thereof to the corresponding trailer lighting system electrical line to thereby connect the tractor thereto.

26. The system of claim 20 further including a third plurality of switching devices each having an input connected to the tractor and an output switchable between an electrical line forming part of the trailer lighting system and an open position;

and wherein said trailer control module controls said third plurality of switching devices to connect the output of a first one thereof to the corresponding trailer lighting system electrical line to thereby connect the tractor thereto.

27. The system of claim 20 further including an electrical connector housing attached to the trailer, said housing having an electrical connector attached thereto, said electrical connector defining a number of electrical terminals, at least some of said electrical terminals connected to inputs of some of said first plurality of switching devices and others of said electrical terminals connected to electrical lines of a at least a portion of the trailer lighting system, said housing defining an interior thereof and having the trailer communication and power switching system attached to said housing interior.

28. The system of claim 27 wherein said connector is a J-560 connector.

29. The system of claim 27 wherein the trailer communication and power switching system is attached to said housing interior by a potting compound.

30. The system of claim 20 wherein said trailer control module includes a number of status inputs each coupled to at least some of the electrical lines of the trailer lighting system and trailer electrical system, said trailer control module determining a status of each of the corresponding electrical lines by monitoring a signal level thereat.

31. The system of claim 20 wherein said trailer control module includes a number of diagnostic inputs each coupled to portions of the trailer electrical system, said trailer control module communicating diagnostic information relating thereto to the tractor on said communication line.

32. The system of claim 31 wherein said first one of said trailer electrical system electrical lines corresponds to a power supply input of an anti-lock brake system (ABS) associated with the trailer;

and wherein one of said diagnostic inputs is coupled to an ABS fault circuit operable to monitor said ABS and generate an ABS fault diagnostic signal if said ABS malfunctions.

33. The system of claim 31 wherein one of said diagnostic inputs is coupled to a trailer door circuit operable to monitor a trailer door and provide a door ajar diagnostic signal if the trailer door is detected by the trailer door circuit as being ajar.

34. A method of operating an electronic trailer control module to provide a dedicated electrical power line from a tractor to a trailer electrical system, the method comprising the steps of:

controlling a first switching device, associated with the trailer control module and having an output connected to the tractor, to establish a single unpowered communication line therethrough from the tractor to the trailer control module by disconnecting a first electrical line of a trailer lighting system from an input thereof and connecting a communication port of the trailer control module thereto;

sending a heartbeat signal on the single unpowered communication line;

monitoring the single unpowered communication line after sending the heartbeat signal thereon;

controlling a second switching device, associated with the trailer control module and having an output connected to the tractor, to provide a dedicated power line from the tractor to a trailer electrical system if an acknowledgment signal is detected on the single unpowered communication line within a first predetermined time period after sending the heartbeat signal thereon by disconnecting a second electrical line of the tractor lighting system from an input thereof and connecting an electrical power line of the trailer electrical system thereto.

35. The method of claim 34 wherein the method includes operating the trailer control module to provide a dedicated ground line from the tractor to the trailer electrical system;

and further including the step of controlling a third switching device, associated with the trailer control module and having an input connected to a ground line of the tractor, to provide a dedicated ground line to the trailer electrical system by disconnecting a third trailer lighting system electrical line from an output thereof and connecting the trailer electrical system thereto.

36. The method of claim 35 wherein the trailer electrical system is an anti-lock brake system (ABS).

37. The method of claim 34 wherein the trailer control module includes a number of diagnostic inputs coupled to diagnostic generating portions of the trailer electrical system, further including the steps of:

monitoring the diagnostic inputs and sending detected diagnostic information to the tractor on the communication line;

periodically sending a heartbeat signal on the communication line;

monitoring the communication line after sending the heartbeat signal thereon; and controlling the first and second switching devices to disconnect the communication port and trailer electrical system respectively therefrom and reconnect the first and second electrical lines respectively of the trailer lighting system thereto if an acknowledgment signal is not detected on the communication line within the first predetermined time period after sending each periodic heartbeat signal thereon.

38. The method of claim 37 wherein the trailer electrical system is an anti-lock brake system (ABS);

and wherein at least one of the diagnostic generating portions of the trailer electrical system is an ABS fault diagnostic portion operable to monitor the ABS and generate an ABS fault diagnostic signal for detection by a corresponding diagnostic input of the trailer control module if the ABS malfunctions.

39. The method of claim 37 further including the following step prior to performing any of steps:

monitoring the input of the first switching device and performing the remaining steps only if a signal other than a constant signal is detected thereon.

40. The method of claim 39 wherein the method includes operating the trailer control module to provide a dedicated ground line from the tractor to the electrical system of the trailer;

and further includes the steps of:
controlling a third switching device, associated with the trailer control module and having an input connected to a ground line of the tractor, to provide a dedicated ground line to the trailer electrical system by disconnecting a third trailer lighting system electrical line from an output thereof and connecting the trailer electrical system thereto; and controlling the third switching device to disconnect the trailer electrical system therefrom and reconnect the third electrical line of the trailer lighting system thereto if the acknowledgment signal is not detected on the communication line within the first predetermined time period after sending the periodic heartbeat signal.

41. The method of claim 40 wherein the trailer control module includes a power supply input;

and further including the step of controlling a fourth switching device, associated with the trailer control module and having an input connected to the power supply input of the trailer control module, to connect an output thereof to a powered electrical line of the tractor.

42. The method of claim 34 wherein the trailer control module includes a power supply input;

and further including the step of controlling a third switching device, associated with the trailer control module and having an input connected to the power supply input of the trailer control module, to connect an output thereof to a powered electrical line of the tractor.

43. The method of claim 34 wherein the trailer electrical system is an anti-lock brake system (ABS).

44. Power and communications link between a tractor and trailer comprising:

means associated with the tractor for switching a plurality of electrical lines extending into the trailer between an electrical line forming part of an electrical system of the tractor and one of an electrical power line and a first unpowered communication line;

means for controlling said means associated with the tractor for switching a plurality of electrical lines extending into the trailer and for sending and receiving communication signals on said first unpowered communication line;

means associated with the trailer for switching said plurality of electrical lines extending into the trailer between an electrical line forming part of an electrical lighting system of the trailer and one of an electrical line forming part of a trailer electrical system and a second unpowered communication line; and means for controlling said means associated with the trailer for switching said plurality of electrical lines extending into the trailer and for sending and receiving communications signals on said second unpowered communication line;

the power and communications link operable to connect said first communication line to said second communication line to form a single unpowered communication line between the tractor and trailer, and to route electrical power from the electrical system of the tractor to said trailer electrical system.

45. The power and communications link of claim 44 wherein said means associated with the tractor for switching a plurality of electrical lines extending into the trailer includes a first plurality of switching devices each having an input switchable between said electrical system forming part of an electrical system of the tractor and one of said electrical power line and said first communication line, and an output.

46. The power and communications link of claim 45 wherein said means associated with the trailer for switching said plurality of electrical lines extending into the trailer includes a second plurality of switching devices each having an input connected to an output of one of said first plurality of switching devices, and an output switchable between an electrical line forming part of said electrical lighting system of the trailer and one of an electrical line forming part of said trailer electrical system and said second communication line.

47. The power and communications link of claim 46 wherein at least one of said first plurality of switching devices has an input switchable between a tractor electrical system electrical line and a ground reference of the tractor, and an output;

and wherein the power and communications link further controls said plurality of first and second switching devices to route a dedicated ground line to said trailer electrical system.

48. The power and communications link of claim 47 wherein said trailer electrical system is an anti-lock brake system (ABS).

49. The power and communications link of claim 44 wherein said means for controlling said means associated with the tractor for switching a plurality of electrical lines extending into the trailer includes a tractor control module having an input/output connected to said first communication line.

50. The power and communications link of claim 44 wherein said means for controlling said means associated with the trailer for switching said plurality of electrical lines extending into the trailer includes a trailer control module having an input/output connected to said second communication line.

51. The power and communications link of claim 44 wherein said trailer electrical system is an anti-lock brake system (ABS).

52. Power and communications link between a tractor and trailer comprising:

- a first plurality of switching devices each having an input switchable between an electrical line forming part of an electrical system of the tractor and one of a tractor electrical power line and a tractor electrical ground line, and an output;
- a tractor control module associated with the tractor for controlling said first plurality of switching devices, said tractor control module having a communications port;
- a second plurality of switching devices each having an input and an output switchable between an electrical line forming part of a trailer lighting system and an electrical line forming part of a trailer electrical system;
- a trailer control module associated with the trailer for controlling said second plurality of switching devices, said trailer control module having a communications port;
- means for connecting said outputs of said first plurality of switching devices to said inputs of said second plurality of switching devices; and
- a single unpowered communications line connected between said tractor control module communications port and said trailer control module communications port, said tractor and trailer control modules operable to communicate via said single unpowered communication line.

* * * * *